(12) United States Patent
Aisaka et al.

(10) Patent No.: US 8,494,256 B2
(45) Date of Patent: Jul. 23, 2013

(54) IMAGE PROCESSING APPARATUS AND METHOD, LEARNING APPARATUS AND METHOD, AND PROGRAM

(75) Inventors: Kazuki Aisaka, Kanagawa (JP); Masatoshi Yokokawa, Tokyo (JP); Jun Murayama, Tokyo (JP)

(73) Assignee: Sony Corporation, Tokyo (JP)

( * ) Notice: Subject to any disclaimer, the term of this patent is extended or adjusted under 35 U.S.C. 154(b) by 539 days.

(21) Appl. No.: 12/738,783

(22) PCT Filed: Aug. 26, 2009

(86) PCT No.: PCT/JP2009/064818
§ 371 (c)(1),
(2), (4) Date: Apr. 19, 2010

(87) PCT Pub. No.: WO2010/024265
PCT Pub. Date: Mar. 4, 2010

(65) Prior Publication Data
US 2010/0246939 A1    Sep. 30, 2010

(30) Foreign Application Priority Data
Aug. 26, 2008 (JP) .................. 2008-216985

(51) Int. Cl.
*G06K 9/62* (2006.01)
*G06K 9/46* (2006.01)

(52) U.S. Cl.
USPC .......................... 382/156; 382/195

(58) Field of Classification Search
USPC ............... 382/156, 159, 195, 199, 254, 255, 382/260, 263, 264, 266
See application file for complete search history.

(56) References Cited

U.S. PATENT DOCUMENTS 7,586,520 B2 *  9/2009  Igarashi ............... 348/208.6
7,990,429 B2 *  8/2011  Saito .................... 348/222.1
(Continued)

FOREIGN PATENT DOCUMENTS

JP    11-312243    11/1999
JP    2003-324610  11/2003
(Continued)

OTHER PUBLICATIONS

International Search Report from the Japanese Patent Office in International Application No. PCT/JP2009/064818 mailed Nov. 24, 2009.

(Continued)

*Primary Examiner* — Daniel Mariam
(74) *Attorney, Agent, or Firm* — Finnegan, Henderson, Farabow, Garrett & Dunner, L.L.P.

(57) ABSTRACT

The present invention relates to an image processing apparatus and method, a learning apparatus and method, and a program which allow reliable evaluation of whether or not the subject appears sharp.
A subject extraction unit 21 uses an input image to generate a subject map representing a region including the subject in the input image, and supplies the subject map to a determination unit 22. The determination unit 22 uses the input image and the subject map from the subject extraction unit 21 to determine the blur extent of the region of the subject on the input image, and calculates the score of the input image on the basis of the blur extent. This score is regarded as an index for evaluating the degree to which the subject appears sharp in the input image. The present invention can be applied to an image capture apparatus.

4 Claims, 25 Drawing Sheets

U.S. PATENT DOCUMENTS

| | | |
|---|---|---|
| 2003/0151674 A1 | 8/2003 | Lin |
| 2003/0161520 A1 | 8/2003 | Yamano et al. |
| 2005/0249429 A1* | 11/2005 | Kitamura ................. 382/255 |
| 2006/0078218 A1 | 4/2006 | Igarashi |
| 2009/0052783 A1* | 2/2009 | Aoki et al. ................. 382/209 |
| 2009/0096897 A1 | 4/2009 | Saito |

FOREIGN PATENT DOCUMENTS

| | | |
|---|---|---|
| JP | 2005-115525 | 4/2005 |
| JP | 2005-123823 | 5/2005 |
| JP | 2005-182412 | 7/2005 |
| JP | 2005-521927 | 7/2005 |
| JP | 2006-254107 | 9/2006 |
| JP | 2006-311340 | 11/2006 |
| JP | 2007-027971 | 2/2007 |
| JP | 2007-226314 | 9/2007 |
| JP | 2007-257470 | 10/2007 |
| JP | 2008-170284 | 7/2008 |
| WO | WO 2007-049634 | 5/2007 |

OTHER PUBLICATIONS

English-language search report dated Jan. 4, 2012, from the European Patent Office in corresponding European Application No. EP 09 80 9916.

Japanese Patent Application No. 2008-216985 corresponding to U.S. Appl. No. 12/738,783 in cited references listed.

Laurent Itti et al., "Feature combination strategies for saliency-based visual attention systems", Journal of Electronic Imaging Jan. 2001 vol. 10(1) 161-169.

* cited by examiner

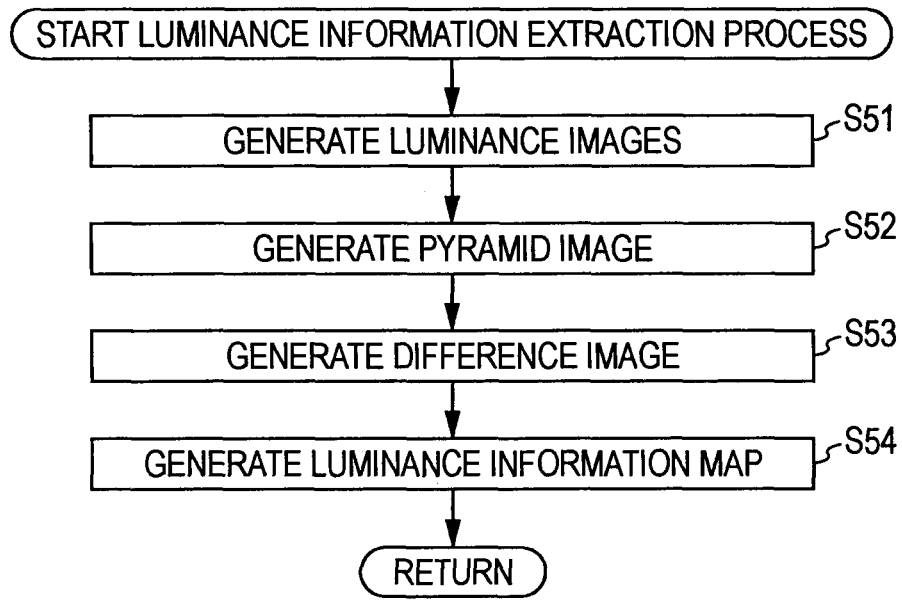
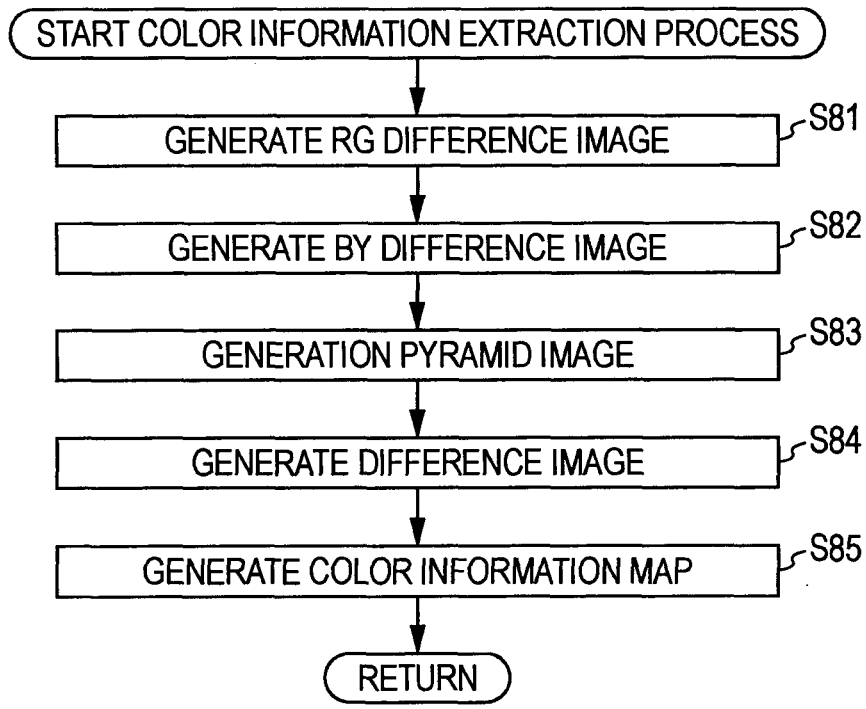

IMAGE PROCESSING APPARATUS AND METHOD, LEARNING APPARATUS AND METHOD, AND PROGRAM

CROSS REFERENCE TO RELATED APPLICATIONS

This application is a national phase application based on PCT/JP2009/064818, filed Aug. 26, 2009, which claims the priority of Japanese Patent Application No. 2008-216985, filed Aug. 26, 2008, the contents of all of which are incorporated herein by reference.

TECHNICAL FIELD

The present invention relates to an image processing apparatus and method, a learning apparatus and method, and a program. More specifically, the present invention relates to an image processing apparatus and method, a learning apparatus and method, and a program which allow easy selection of an image estimated to be acceptable to view.

BACKGROUND ART

In the case of utilizing an album creation function for organizing images obtained by image capture, such as photographs, or an image slideshow function, users need to select images to save or display. However, it is a hard task to select necessary images from among a large number of images.

Thus, as a technique for selecting the so-called best shot, that is, an image estimated to be acceptable for a user to view, from among a plurality of images, there is known a technique for selecting the best shot from among a plurality of continuously shot images (see, for example, PTL 1).

In addition, as image-related techniques, there are also known a technique for evaluating the photographic quality of an image on the basis of the sharpness of the image, the quality of a face image, and the presence or absence of flare (see, for example, PTL 2) and a technique for detecting a face from an image and selecting and extracting an optimum composition in accordance with the detection result (see, for example, PTL 3).

CITATION LIST

Patent Literature

PTL 1: Japanese Unexamined Patent Application Publication No. 2006-311340
PTL 2: Japanese Unexamined Patent Application Publication (Translation of PCT Application) No. 2005-521927
PTL 3: Japanese Unexamined Patent Application Publication No. 2007-27971

SUMMARY OF INVENTION

Technical Problem

In the techniques described above, however, it has been difficult to reliably evaluate whether or not an image to be evaluated is an image estimated to be acceptable for a user to view, that is, an image in which the subject appears sharp.

For example, a technique for selecting the best shot from among continuously shot images involves evaluation of the blurriness and exposure of an entire image. However, the evaluation of the blurriness or exposure of general images other than those obtained by continuously shooting may not necessarily lead to increased evaluation of well captured images.

That is to say, in general, in a photograph with the subject in focus over a blurring background, the subject appears sharp, and hence such a photograph is often a well captured shot called best shot. However, the use of the technique described in PTL 1 for images other than those continuously shot can cause a possibility that an image in which the entire image is in focus, rather than an image in which the subject is in focus but the background is blurry, is selected as the best shot.

In addition, in the technique described in PTL 2, since the quality of an image is evaluated on the assumption that the subject is a human face, in a case where no face could be detected from an image, the quality of the image is evaluated using the sharpness and the presence or absence of flare. Therefore, in such a case, an image in which the entire image is in focus may have a higher evaluation than an image in which the subject is in focus but the background is blurry.

Furthermore, the technique described in PTL 3 allows the extraction of an optimum composition but does not allow evaluation of whether or not an image is a well captured image. In addition, this technique does not allow the extraction of an optimum composition in a case where an image does not include a human face as the subject.

The present invention has been made in view of such a situation, and intends to allow more reliable evaluation of whether or not an image to be evaluated is an image in which the subject appears sharp.

Solution to Problem

An image processing apparatus in a first aspect of the present invention includes generating means for generating, on the basis of an input image, subject specification information for specifying a region of a subject on the input image, and detecting means for detecting a blur extent of the subject in a region including the subject in the input image, the region being used as a target of processing, using the subject specification information and the input image.

The generating means can be provided with information map generating means for extracting a feature value of a feature of the region of the subject from the input image and generating an information map representing the feature value in each region of the input image, and subject specification information generating means for generating the subject specification information by performing weighted addition of the plurality of information maps representing the feature value of the feature, which are different from each other.

The detecting means can be caused to detect a strength of an edge in the region of the subject to thereby detect the blur extent of the subject.

The information map generating means can be caused to extract the feature value from the input image to generate a feature image representing the feature value in each region of the input image, and can further be caused to generate a plurality of feature images having resolutions different from each other on the basis of the feature image and to determine a difference between the plurality of feature images to thereby generate the information map.

An image processing method or a program in the first aspect of the present invention includes the steps of generating, on the basis of an input image, subject specification information for specifying a region of a subject on the input image, and detecting a blur extent of the subject in a region including the subject in the input image, the region being used as a target of processing, using the subject specification information and the input image.

In the first aspect of the present invention, subject specification information for specifying a region of a subject on an input image is generated on the basis of the input image, and the subject specification information and the input image are used to detect the blur extent of the subject in a region including the subject in the input image, the region being used as a target of processing.

A learning apparatus in a second aspect of the present invention is a learning apparatus that determines a weight using neural-network-based learning, the weight being used to generate a subject map for specifying a region of a subject on an image, including information map generating means for extracting a feature value of a feature of the region of the subject from a learning image that includes the subject and that is used for the learning, and generating an information map representing the feature value in each region of the learning image, subject map generating means for generating the subject map by performing weighted addition of, using the weight, the plurality of information maps representing the feature value of the feature, which are different from each other, weight change amount calculating means for calculating an amount of change by which the weight is to be changed using the subject map and an image label that is determined in advance and that represents the region of the subject in the learning image, and updating means for adding the amount of change to the weight and updating the weight.

A learning method or a program in the second aspect of the present invention is a learning method or a program for determining a weight using neural-network-based learning, the weight being used to generate a subject map for specifying a region of a subject on an image, including the steps of extracting a feature value of a feature of the region of the subject from a learning image that includes the subject and that is used for the learning, and generating an information map representing the feature value in each region of the learning image; generating the subject map by performing weighted addition of, using the weight, the plurality of information maps representing the feature value of the feature, which are different from each other; calculating an amount of change by which the weight is to be changed using the subject map and an image label that is determined in advance and that represents the region of the subject in the learning image; and adding the amount of change to the weight and updating the weight.

In the second aspect of the present invention, in a learning process for determining a weight using neural-network-based learning, the weight being used to generate a subject map for specifying a region of a subject on an image, a feature value of a feature of the region of the subject is extracted from a learning image that includes the subject and that is used for the learning, and an information map representing the feature value in each region of the learning image is generated; the subject map is generated by performing weighted addition of, using the weight, the plurality of information maps representing the feature value of the feature, which are different from each other; an amount of change by which the weight is to be changed is calculated using the subject map and an image label that is determined in advance and that represents the region of the subject in the learning image; and the amount of change is added to the weight and the weight is updated.

Advantageous Effects of Invention

According to the first aspect of the present invention, it is possible to evaluate an image. In particular, according to the first aspect of the present invention, it is possible to more reliably select an image in which it is estimated that the subject appears sharp.

In addition, according to the second aspect of the present invention, it is possible to determine a weight that is used to evaluate an image. In particular, according to the second aspect of the present invention, it is possible to provide a weight that is used to more reliably select an image in which it is estimated that the subject appears sharp.

BRIEF DESCRIPTION OF DRAWINGS

FIG. 9 is a flowchart explaining a luminance information extraction process.

FIG. 10 is a flowchart explaining a color information extraction process.

DESCRIPTION OF EMBODIMENTS

Embodiments to which the present invention is applied will be explained hereinafter with reference to the drawings.
[Configuration of Image Processing Apparatus]

Figure 1:
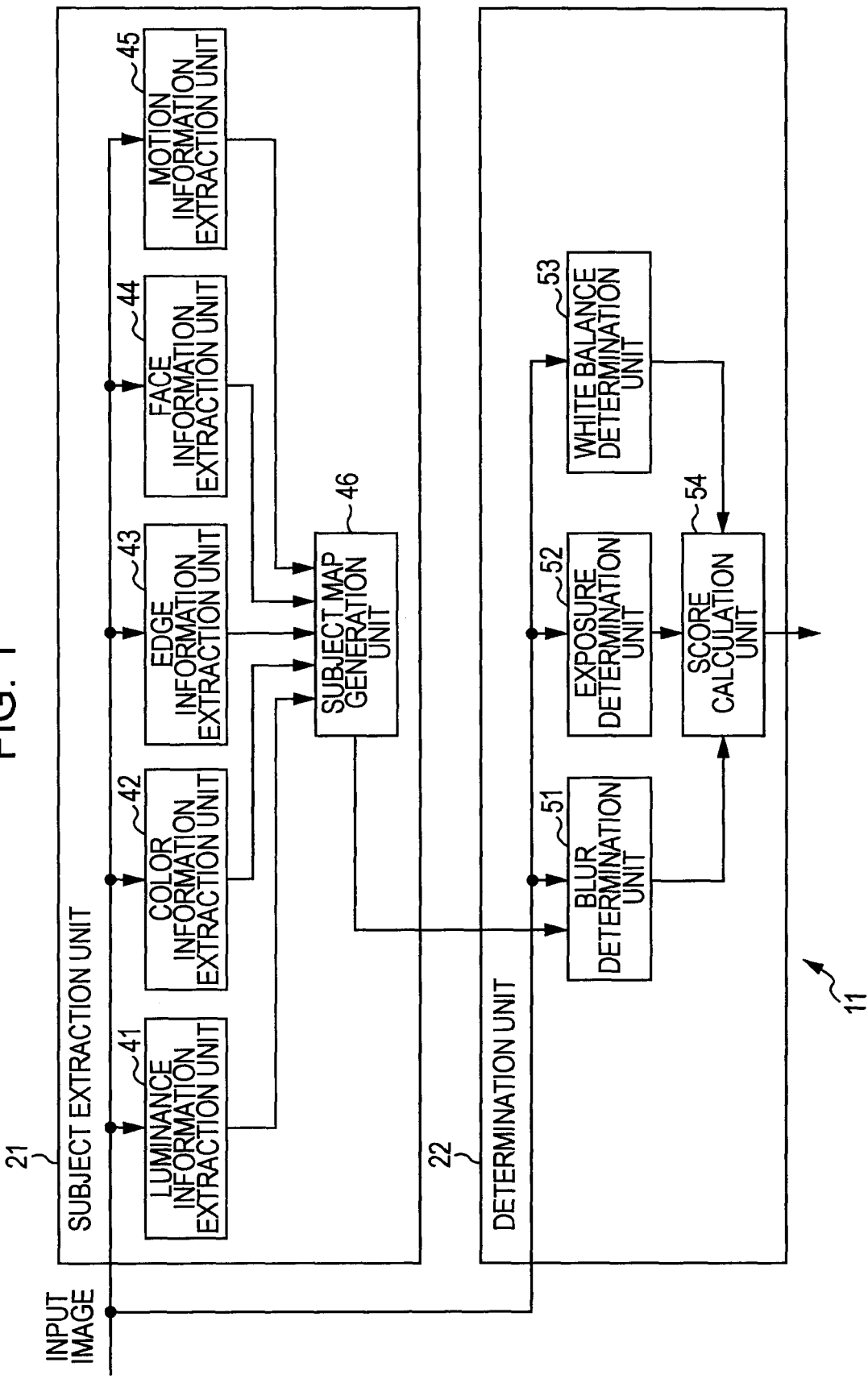
FIG. 1 is a diagram illustrating an example configuration of an embodiment of an image processing apparatus to which the present invention is applied.

FIG. 1 is a block diagram illustrating an example configuration of an embodiment of an image processing apparatus to which the present invention is applied.

An image processing apparatus 11 is mounted in, for example, an image capture apparatus such as a camera, and performs an evaluation of an input image that has been captured. In the evaluation of an input image, an image in which it is estimated that the subject on the input image is not out-of-focus or blurred but appears sharp is regarded as a well captured image, namely, the best shot. Conversely, an image with the subject blurred or an image that looks overexposed is regarded as a not well captured image, namely, a bad shot.

That is, an input image in which it is estimated that the subject appears sharper is regarded as an image that is more acceptable for a user to view, and is given a higher evaluation value (score). Then, for example, in a case where an input image has an evaluation value greater than or equal to a designated threshold value, the input image is regarded as the best shot.

The image processing apparatus 11 is configured using a subject extraction unit 21 and a determination unit 22, and an input image obtained by image capture is supplied to the subject extraction unit 21 and the determination unit 22.

The subject extraction unit 21 detects the subject from the supplied input image, generates a subject map that is information for specifying a region including the subject in the input image, and supplies the subject map to the determination unit 22. Here, the detection of the subject is performed on the assumption that an object on the input image to which it is estimated that a user attends in a case where the user glances at the input image, that is, an object to which it is estimated that the user directs his/her eye, is the subject. Therefore, the subject is not necessarily limited to a human.

The subject extraction unit 21 is configured using a luminance information extraction unit 41, a color information extraction unit 42, an edge information extraction unit 43, a face information extraction unit 44, a motion information extraction unit 45, and a subject map generation unit 46.

The luminance information extraction unit 41 generates, on the basis of the supplied input image, a luminance information map indicating information relating to luminance in each region of the input image, and supplies the luminance information maps to the subject map generation unit 46. The color information extraction unit 42 generates, on the basis of the supplied input image, a color information map indicating information relating to colors in each region of the input image, and supplies the color information maps to the subject map generation unit 46.

The edge information extraction unit 43 generates, on the basis of the supplied input image, an edge information map indicating information relating to edges in each region of the input image, and supplies the edge information maps to the subject map generation unit 46. The face information extraction unit 44 generates, on the basis of the supplied input image, a face information map indicating information relating to a human face as the subject in each region of the input image, and supplies the face information maps to the subject map generation unit 46. The motion information extraction unit 45 generates, on the basis of the supplied input image, a motion information map indicating information relating to a motion in each region of the input image, and supplies the motion information maps to the subject map generation unit 46.

Note that in the following, the luminance information maps through motion information maps output from the luminance information extraction unit 41 through motion information extraction unit 45 will also be referred to simply as information maps unless they need to be individually distinguished from each other. The information included in these information maps is regarded as pieces of information indicating the feature values of a larger number of features included in the region including the subject, and an arrangement of the pieces of information in correspondence with each region of the input image is regarded as an information map. That is, an information map can be said to be information indicating the feature value in each region of the input image.

Therefore, a region on the input image corresponding to a region with a larger amount of information in each information map, that is, a region with a larger feature value, becomes a region that more probably includes the subject, and the individual information maps allow specification of a region including the subject in the input image.

The subject map generation unit 46 linearly combines the luminance information maps, the color information maps, the edge information maps, the face information maps, and the motion information maps supplied from the luminance information extraction unit 41 through motion information extraction unit 45 to generate a subject map. That is to say, information (feature values) of the luminance information maps through motion information maps about each region is subjected to weighted addition for each of regions located at the same position, and a subject map is generated. The subject map generation unit 46 supplies the generated subject map to the determination unit 22.

The determination unit 22 calculates a score serving as an index for evaluating the input image using the supplied input image and the subject map supplied from the subject map generation unit 46 of the subject extraction unit 21, and outputs the score. The determination unit 22 is configured using a blur determination unit 51, an exposure determination unit 52, a white balance determination unit 53, and a score calculation unit 54.

The blur determination unit 51 uses the supplied input image and the subject map supplied from the subject map generation unit 46 to detect the blur extent (degree of blur) of the subject in a region including the subject in the input image, the region being used as a target of processing, and supplies the detection result to the score calculation unit 54.

The exposure determination unit 52 detects the degree of severity of exposure in the entire input image on the basis of the supplied input image, and supplies the detection result to the score calculation unit 54. In addition, the white balance determination unit 53 detects the degree of severity of white balance in the entire input image on the basis of the supplied input image, and supplies the detection result to the score calculation unit 54. The score calculation unit 54 calculates the score of the input image on the basis of the detection results respectively supplied from the blur determination unit 51, the exposure determination unit 52, and the white balance determination unit 53, and outputs the score.

Next, more detailed configurations of the luminance information extraction unit 41 through motion information extraction unit 45 and the blur determination unit 51 in FIG. 1 will be explained with reference to FIGS. 2 to 7.

Figure 2:
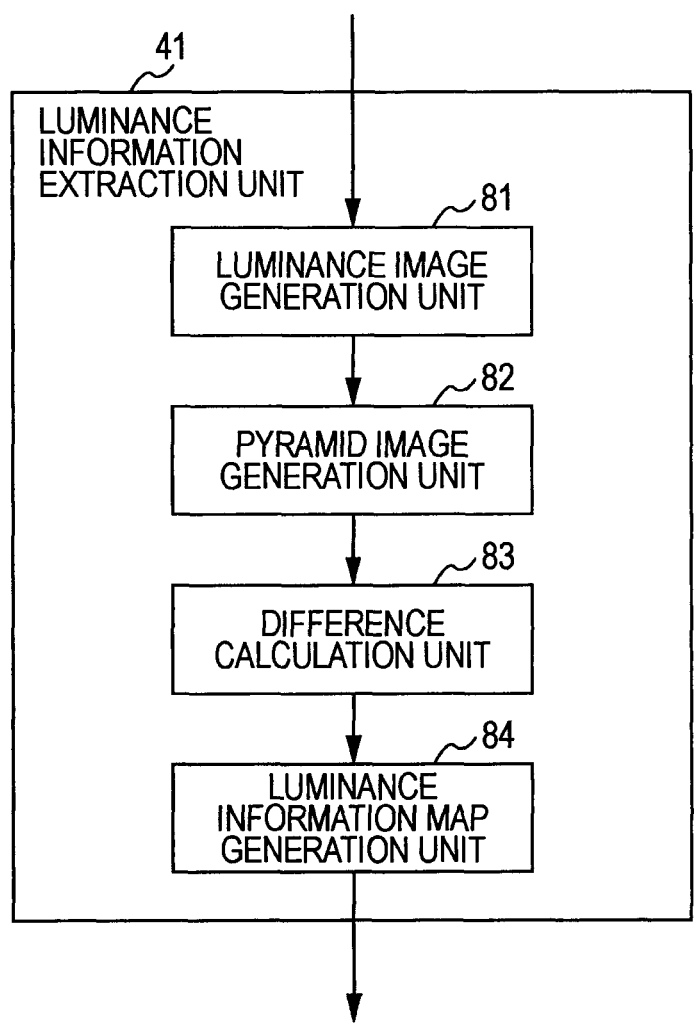
FIG. 2 is a diagram illustrating an example configuration of a luminance information extraction unit.

FIG. 2 is a block diagram illustrating an example configuration of the luminance information extraction unit 41.

The luminance information extraction unit 41 is configured using a luminance image generation unit 81, a pyramid image generation unit 82, a difference calculation unit 83, and a luminance information map generation unit 84.

The luminance image generation unit 81 uses the supplied input image to generate a luminance image in which the luminance value of a pixel in the input image is used as the pixel value of a pixel, and supplies the luminance image to the pyramid image generation unit 82. Here, the pixel value of a desired pixel in the luminance image represents the luminance value of a pixel located in the input image at the same position as that of the pixel.

The pyramid image generation unit 82 generates a plurality of luminance images having resolutions different from each other using the luminance image supplied from the luminance image generation unit 81, and supplies these luminance images to the difference calculation unit 83 as luminance pyramid images.

For example, pyramid images in eight layers of resolutions of levels L1 through L8 are generated, and it is assumed that the pyramid images in the resolutions of levels L1 to L8 are ranked in descending order from the pyramid image in the resolution of level L1 as the highest level.

In this case, the luminance image generated by the luminance image generation unit 81 is regarded as the pyramid image of level L1. In addition, the average value of the pixel values of four adjacent pixels in the pyramid image of level Li (where $1 \leq i \leq 7$) is regarded as the pixel value of one pixel corresponding to those pixels in the pyramid image of level L(i+1). Therefore, the pyramid image of level L(i+1) is an image having horizontal and vertical dimensions that are half the pyramid image of level Li (in a case where the values are indivisible, they are truncated).

The difference calculation unit 83 selects two pyramid images in different layers from among the plurality of pyramid images supplied from the pyramid image generation unit 82, and determines the difference between the selected pyramid images to generate a luminance difference image. Note that since the pyramid images in the respective layers are different in size (the number of pixels), at the time of the generation of a difference image, a smaller pyramid image is up-converted in accordance with a larger pyramid image.

When a predefined number of luminance difference images are generated, the difference calculation unit 83 normalizes these generated difference images, and supplies the results to the luminance information map generation unit 84. The luminance information map generation unit 84 generates luminance information maps on the basis of the difference images supplied from the difference calculation unit 83, and supplies the luminance information maps to the subject map generation unit 46.

Figure 3:
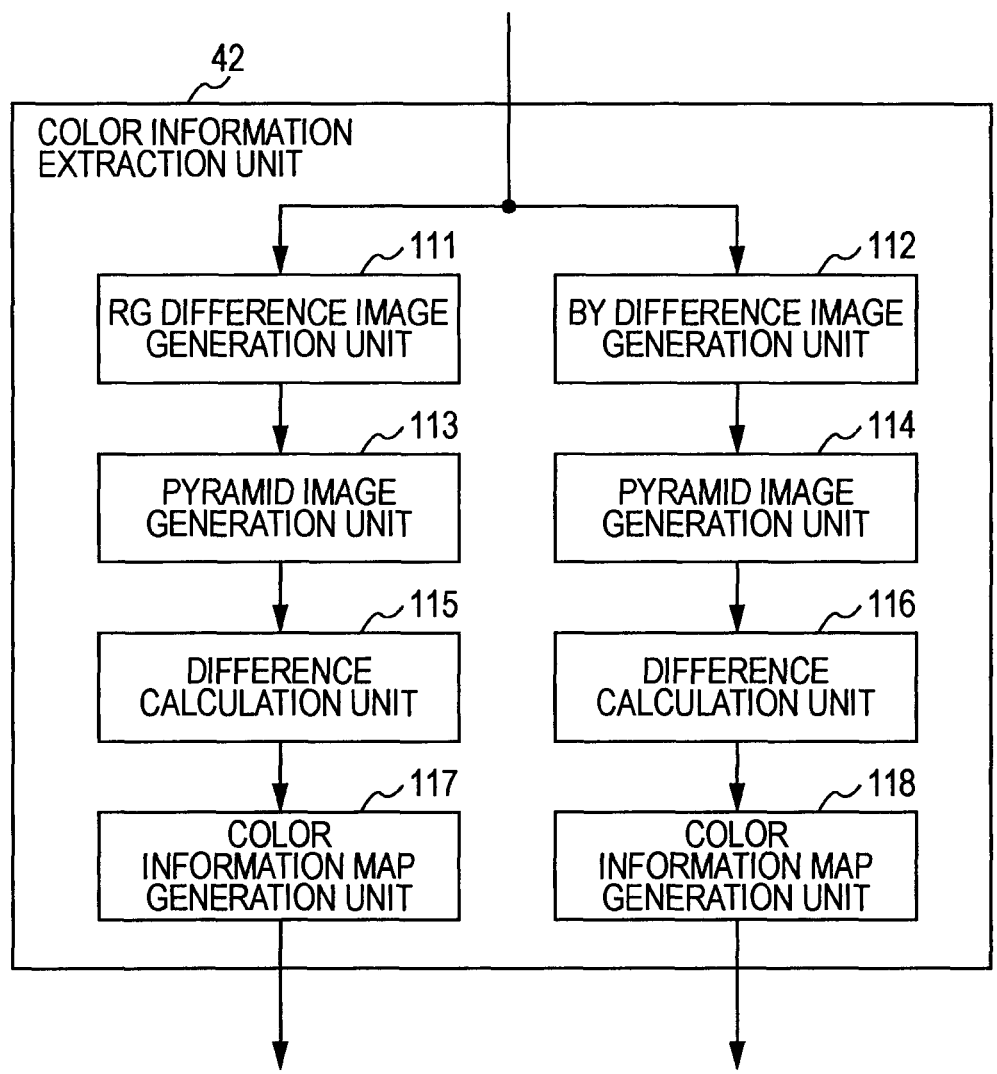
FIG. 3 is a diagram illustrating an example configuration of a color information extraction unit.

FIG. 3 is a block diagram illustrating an example configuration of the color information extraction unit 42 in FIG. 1.

The color information extraction unit 42 is configured using an RG difference image generation unit 111, a BY difference image generation unit 112, a pyramid image generation unit 113, a pyramid image generation unit 114, a difference calculation unit 115, a difference calculation unit 116, a color information map generation unit 117, and a color information map generation unit 118.

The RG difference image generation unit 111 uses the supplied input image to generate an RG difference image in which the difference between the R (red) component and the G (green) component of a pixel in the input image is used as the pixel value of a pixel, and supplies the RG difference image to the pyramid image generation unit 113. The pixel value of a desired pixel in the RG difference image represents the value of the difference between the R component and the G component of a pixel located in the input image at the same position as that of the pixel.

The BY difference image generation unit 112 uses the supplied input image to generate a BY difference image in which the difference between the B (blue) component and the Y (yellow) component of a pixel in the input image is used as the pixel value of a pixel, and supplies the BY difference image to the pyramid image generation unit 114. The pixel value of a desired pixel in the BY difference image represents the value of the difference between the B (blue) component and the Y (yellow) component of a pixel located in the input image at the same position as that of the pixel.

The pyramid image generation unit 113 and the pyramid image generation unit 114 use the RG difference image and the BY difference image supplied from the RG difference image generation unit 111 and the BY difference image generation unit 112 to generate a plurality of RG difference images having resolutions different from each other and a plurality of BY difference images having resolutions different from each other. Then, the pyramid image generation unit 113 and the pyramid image generation unit 114 supply these generated RG difference images and BY difference images to the difference calculation unit 115 and the difference calculation unit 116 as pyramid images of RG differences and pyramid images of BY differences.

As the pyramid images of the RG differences and the pyramid images of the BY differences, similarly to the case of luminance pyramid images, for example, pyramid images in eight layers of resolutions of levels L1 through L8 are generated respectively.

The difference calculation unit 115 and the difference calculation unit 116 select two pyramid images in different layers from among the plurality of pyramid images supplied from the pyramid image generation unit 113 and the pyramid image generation unit 114, and determine the difference between the selected pyramid images to generate a difference image of the RG difference and a difference image of the BY difference. Note that since the pyramid images in the respective layers are different in size, at the time of the generation of a difference image, a smaller pyramid image is up-converted so as to have the same size as a larger pyramid image.

When a predefined number of difference images of RG differences and a predefined number of difference images of BY differences are generated, the difference calculation unit 115 and the difference calculation unit 116 normalize these generated difference images, and supply the results to the color information map generation unit 117 and the color information map generation unit 118. The color information map generation unit 117 and the color information map generation unit 118 generate color information maps on the basis of the difference images supplied from the difference calculation unit 115 and the difference calculation unit 116, and supply the color information maps to the subject map generation unit 46. The color information map generation unit 117 generates color information maps about the RG differences, and the color information map generation unit 118 generates color information maps about the BY differences.

Figure 4:
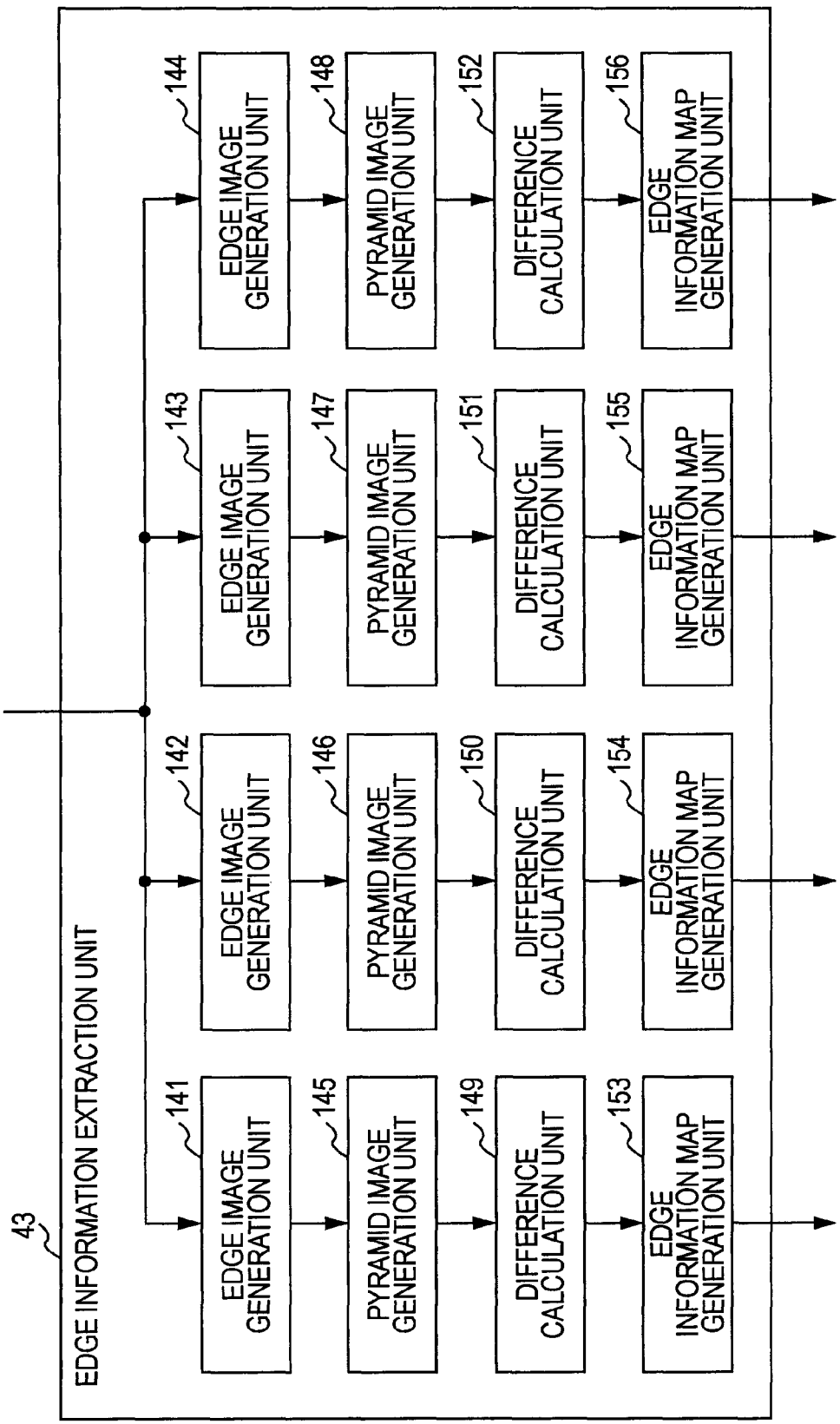
FIG. 4 is a diagram illustrating an example configuration of an edge information extraction unit.

FIG. 4 is a block diagram illustrating an example configuration of the edge information extraction unit 43 in FIG. 1.

The edge information extraction unit 43 is configured using edge image generation units 141 through 144, pyramid image generation units 145 through 148, difference calculation units 149 through 152, and edge information map generation units 153 through 156.

The edge image generation units 141 through 144 perform a filtering process on the supplied input image using a Gabor filter to generate, for example, edge images in which the edge strengths in the directions of 0 degrees, 45 degrees, 90 degrees, and 135 degrees are used as the pixel values of a pixel, and supply the edge images to the pyramid image generation units 145 through 148.

For example, the pixel value of a desired pixel in an edge image generated by the edge image generation unit 141 represents the edge strength of a pixel in the direction of 0 degrees, which is located in the input image at the same position as that of the pixel. Note that each edge direction refers to the direction represented by an angle component in Gabor functions forming a Gabor filter.

The pyramid image generation units 145 through 148 generate a plurality of edge images having resolutions different from each other using the edge images in the respective directions supplied from the edge image generation units 141 through 144. Then, the pyramid image generation units 145 through 148 supply these generated edge images in the respective directions to the difference calculation units 149 through 152 as pyramid images in the respective directions of edges.

As pyramid images in the respective directions of edges, similarly to the case of luminance pyramid images, for example, pyramid images in eight layers of levels L1 through L8 are generated respectively.

The difference calculation units 149 through 152 select two pyramid images in different layers from among the plurality of pyramid images supplied from the pyramid image generation units 145 through 148, and determine the difference between the selected pyramid images to generate difference images in the respective directions of edges. Note that since the pyramid images in the respective layers are different in size, at the time of the generation of a difference image, a smaller pyramid image is up-converted.

When a predefined number of difference images in the respective directions of edges are generated, the difference calculation units 149 through 152 normalize these generated difference images, and supply the results to the edge information map generation units 153 through 156. The edge information map generation units 153 through 156 generate edge information maps in the respective directions on the basis of the difference images supplied from the difference calculation units 149 through 152, and supply the edge information maps to the subject map generation unit 46.

Figure 5:
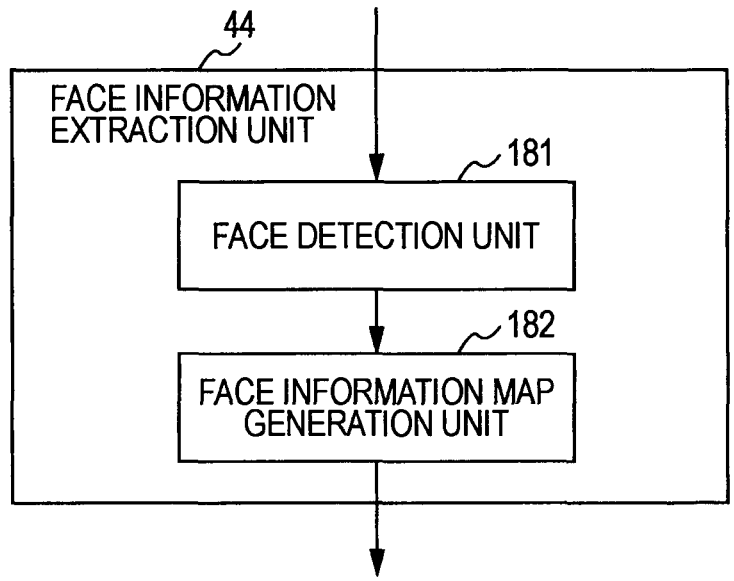
FIG. 5 is a diagram illustrating an example configuration of a face information extraction unit.

FIG. 5 is a block diagram illustrating an example configuration of the face information extraction unit 44 in FIG. 1.

The face information extraction unit 44 is configured using a face detection unit 181 and a face information map generation unit 182.

The face detection unit 181 detects the region of a human face serving as the subject from the supplied input image, and supplies the detection result to the face information map generation unit 182. The face information map generation unit 182 generates a face information map on the basis of the detection result from the face detection unit 181, and supplies the face information map to the subject map generation unit 46.

Figure 6:
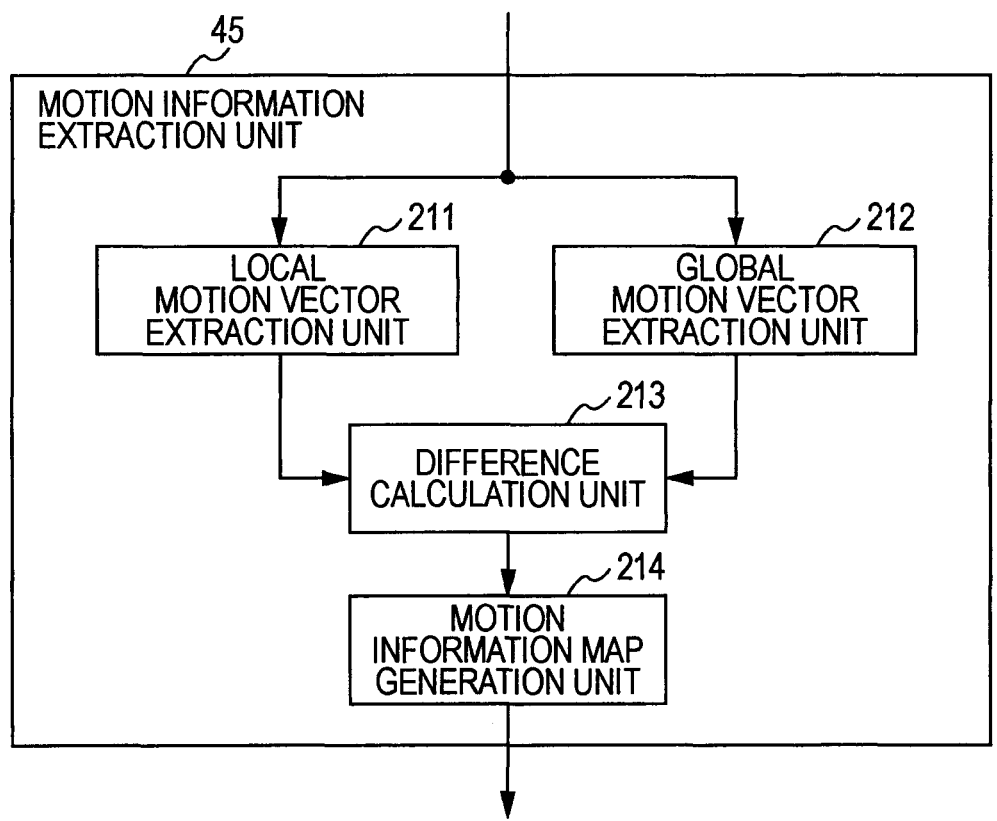
FIG. 6 is a diagram illustrating an example configuration of a motion information extraction unit.

FIG. 6 is a block diagram illustrating an example configuration of the motion information extraction unit 45 in FIG. 1.

The motion information extraction unit 45 is configured using a local motion vector extraction unit 211, a global motion vector extraction unit 212, a difference calculation unit 213, and a motion information map generation unit 214.

The local motion vector extraction unit 211 uses the supplied input image and another input image having a different image capture time from the input image to detect a motion vector of each pixel in the input image as a local motion vector, and supplies the motion vectors to the difference calculation unit 213. The global motion vector extraction unit 212 uses the supplied input image and another input image having a different image capture time from the input image to determine a motion vector of each pixel in the input image and furthermore determine, for example, the average value of these motion vectors of the individual pixels as a global motion vector, and supplies the global motion vector to the difference calculation unit 213. This global motion vector represents the motion direction in the entire input image.

The difference calculation unit 213 determines the absolute values of the differences between the local motion vectors from the local motion vector extraction unit 211 and the global motion vector from the global motion vector extraction unit 212 to generate a motion difference image, and supplies the motion difference image to the motion information map generation unit 214. Here, the pixel value of a desired pixel in the motion difference image represents the absolute value of the difference between the local motion vector of a pixel located in the input image at the same position as that of the pixel and the global motion vector of the entire input image. Therefore, the pixel value of a pixel in the motion difference image represents the amount of relative movement of an object (or a background) displayed in the pixel in the input image with respect to the entire input image, that is, the background.

The motion information map generation unit 214 generates a motion information map on the basis of the motion difference image from the difference calculation unit 213, and supplies the motion information map to the subject map generation unit 46. Note that, more specifically, the generation of a motion information map is performed in a case where images captured successively in time are supplied as input images, for example, in a case where the input image is a series of continuously shot images or a moving image.

Figure 7:
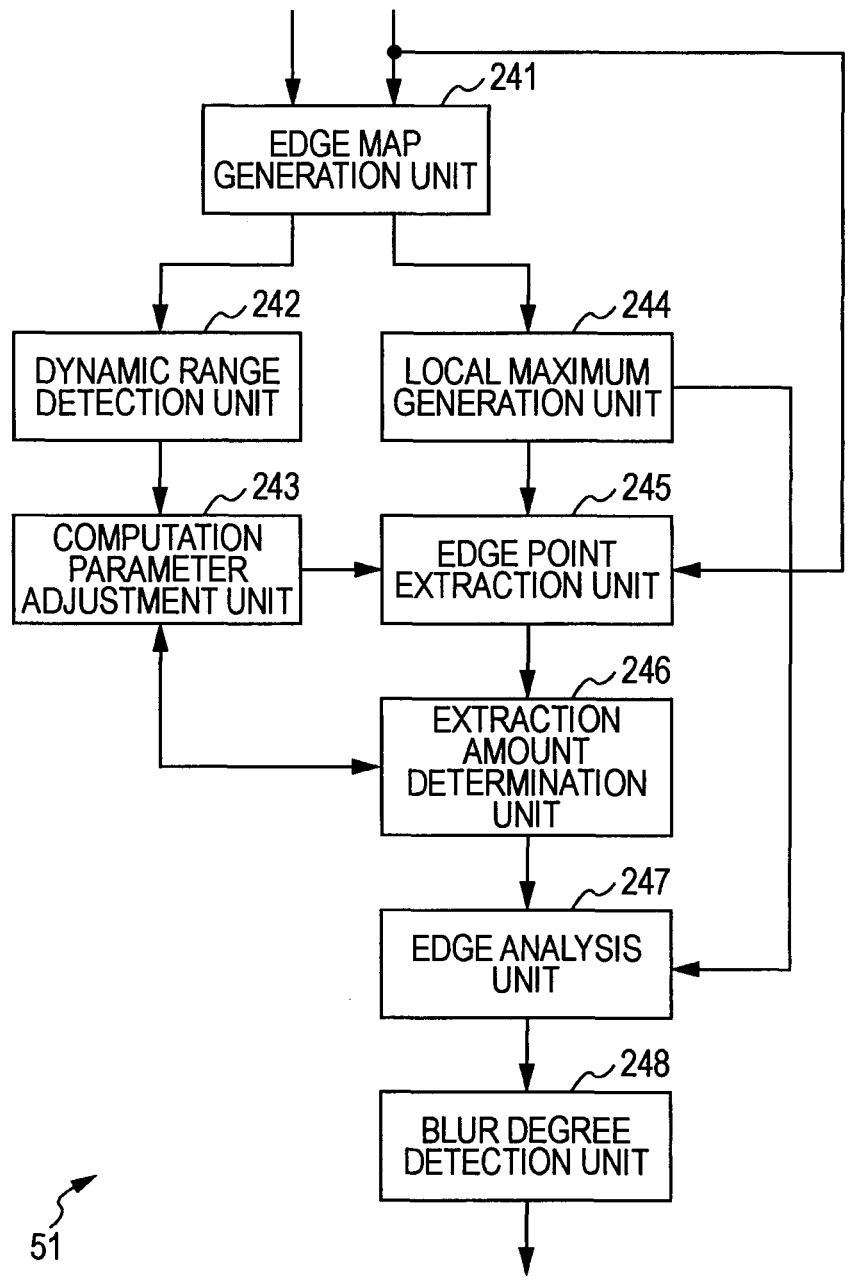
FIG. 7 is a diagram illustrating an example configuration of a blur determination unit.

FIG. 7 is a block diagram illustrating an example configuration of the blur determination unit 51 in FIG. 1.

The blur determination unit 51 is configured using an edge map generation unit 241, a dynamic range detection unit 242, a computation parameter adjustment unit 243, a local maximum generation unit 244, an edge point extraction unit 245, an extraction amount determination unit 246, an edge analysis unit 247, and a blur degree detection unit 248.

The edge map generation unit 241 uses the supplied input image and the subject map from the subject map generation unit 46 to extract, as a subject image, a region estimated to include the subject from the input image.

In addition, the edge map generation unit 241 detects the strength of an edge (edge strength) of the subject image in units of three types of blocks having sizes different from each other on the basis of the subject image, and generates an edge map in which a detected edge strength is used as a pixel value. This edge map is generated for each block size, and edge maps at scales SC1 through SC3 are ranked in order from smallest to largest. The edge map generation unit 241 supplies these three generated edge maps to the dynamic range detection unit 242 and the local maximum generation unit 244.

The dynamic range detection unit 242 uses the edge maps from the edge map generation unit 241 to detect a dynamic range that is the difference between the maximum value and the minimum value of edge strength of the subject image, and supplies the detection result to the computation parameter adjustment unit 243.

The computation parameter adjustment unit 243 adjusts a computation parameter, which is used for the extraction of edge points, so that the amount of extraction of edge points (hereinafter also referred to as an edge point extraction amount) used for the detection of the blur extent of the subject image can become an appropriate value, on the basis of the detection result supplied from the dynamic range detection unit 242. Here, the term edge points refers to pixels forming edges in an image.

In addition, the computation parameter includes an edge reference value used for the determination of an edge point, and an extraction reference value used for the determination of an appropriate edge point extraction amount. The computation parameter adjustment unit 243 supplies the edge reference value to the edge point extraction unit 245 and the extraction amount determination unit 246, and supplies the extraction reference value to the extraction amount determination unit 246.

The local maximum generation unit 244 divides each of the edge maps supplied from the edge map generation unit 241 into blocks each having a designated size, and extracts the maximum pixel value in each block to generate a local maximum. Local maxima are generated for each of the scales of the edge maps, and are supplied from the local maximum generation unit 244 to the edge point extraction unit 245 and the edge analysis unit 247. The local maxima generated from the edge maps at scales SC1 through SC3 are hereinafter referred to as local maxima LM1 through LM3, respectively.

The edge point extraction unit 245 extracts edge points from the region of the subject on the subject image on the basis of the subject map from the subject map generation unit 46, the edge reference value from the computation parameter adjustment unit 243, and the local maxima from the local maximum generation unit 244. In addition, the edge point extraction unit 245 generates an edge point table indicating information about the extracted edge points, and supplies the edge point table to the extraction amount determination unit 246. Note that the edge point tables obtained from the local maxima LM1 through LM3 are hereinafter referred to as edge point tables ET1 through ET3, respectively.

The extraction amount determination unit 246 determines whether or not the edge point extraction amount is appropriate on the basis of the edge point tables from the edge point extraction unit 245 and the extraction reference value from the computation parameter adjustment unit 243. In a case where the edge point extraction amount is not appropriate, the extraction amount determination unit 246 notifies the computation parameter adjustment unit 243 that the edge point extraction amount is not appropriate. In a case where the edge point extraction amount is appropriate, the extraction amount determination unit 246 supplies the current edge reference value and edge point table to the edge analysis unit 247.

The edge analysis unit 247 performs analysis of the edge points in the region of the subject within the subject image on the basis of the edge point table from the extraction amount determination unit 246, and supplies the analysis result to the blur degree detection unit 248. The blur degree detection unit 248 detects a blur degree that is an index indicating the blur extent of the subject on the input image on the basis of the analysis result of the edge points, and supplies the blur degree to the score calculation unit 54.

[Operation of Image Processing Apparatus]

Incidentally, when an input image is supplied to the image processing apparatus 11, the image processing apparatus 11 starts an image evaluation process to determine a score representing the evaluation for the input image, and outputs the score. The image evaluation process will be explained hereinafter with reference to a flowchart of FIG. 8.

In step S11, the luminance information extraction unit 41 performs a luminance information extraction process to generate luminance information maps on the basis of the supplied input image, and supplies the luminance information maps to the subject map generation unit 46. Then, in step S12, the color information extraction unit 42 performs a color information extraction process to generate color information maps on the basis of the supplied input image, and supplies the color information maps to the subject map generation unit 46.

In step S13, the edge information extraction unit 43 performs an edge information extraction process to generate edge information maps on the basis of the supplied input image, and supplies the edge information maps to the subject map generation unit 46. In addition, in step S14, the face information extraction unit 44 performs a face information extraction process to generate face information maps on the basis of the supplied input image, and supplies the face information maps to the subject map generation unit 46. Furthermore, in step S15, the motion information extraction unit 45 performs a motion information extraction process to generate motion information maps on the basis of the supplied input image, and supplies the motion information maps to the subject map generation unit 46.

Note that the details of the above luminance information extraction process, color information extraction process, edge information extraction process, face information extraction process, and motion information extraction process will be described below. In addition, more specifically, the motion information extraction process is not performed in a case where input images captured successively in time are not supplied to the subject extraction unit 21.

In step S16, the subject map generation unit 46 generates a subject map using the luminance information maps through motion information maps supplied from the luminance information extraction unit 41 through motion information extraction unit 45, and supplies the subject map to the blur determination unit 51.

For example, the subject map generation unit 46 linearly combines the individual information maps using information weights Wb that are weights predetermined for the respective information maps, and furthermore multiplies the pixel values of the resulting map by a subject weight Wc that is a predetermined weight to normalize the results to produce a subject map.

That is, assuming that a position (pixel) that is of interest on a subject map to be determined now is a position of interest, the pixel values in the individual information maps at the same position (pixel) as the position of interest are multiplied by the information weights Wb for the respective information maps, and the sum total of the pixel values multiplied by the information weights Wb is regarded as the pixel value at the position of interest. Furthermore, the pixel values at the individual positions on the subject map determined in this manner are multiplied by the subject weight Wc predetermined for the subject map, and the results are normalized to produce a final subject map.

Note that, more specifically, the color information maps for the RG differences and the color information maps for the BY differences are used as color information maps, and the edge information maps in the respective directions of 0 degrees, 45 degrees, 90 degrees, and 135 degrees are used as edge information maps in order to generate a subject map. In addition, the subject weight Wc is determined in advance by learning, and normalization is performed so that the pixel value of each pixel in the subject map can be a value in the range of 0 to 1.

In step S17, the blur determination unit 51 performs a blur determination process using the subject map from the subject map generation unit 46 and the supplied input image to detect a blur degree, and supplies the blur degree to the score calculation unit 54. Note that in the blur determination process, the details of which will be described below, the subject map is used and the blur extent of the region of the subject in the input image is detected.

In step S18, the exposure determination unit 52 performs an exposure determination process to detect the degree of severity of exposure in the entire input image, and supplies the detection result to the score calculation unit 54. For example, the exposure determination unit 52 uses the supplied input image to determine a distribution, with the values of respective components of R (red), G (green), and B (blue) on the abscissa and frequency (frequency of occurrence of a pixel) on the ordinate, of the respective components in the entire input image, and determines a value representing the degree of severity of exposure from the distribution of these components. This value representing the degree of severity of exposure is defined in accordance with, for example, the difference between the frequencies of the respective components at a designated value on the abscissa and a predefined frequency in the distribution of the respective components.

In step S19, the white balance determination unit 53 performs a white balance determination process to detect the degree of severity of white balance in the entire input image, and supplies the detection result to the score calculation unit 54. For example, the white balance determination unit 53 determines an average luminance of the entire input image on the basis of the supplied input image, and uses the value defined in accordance with the average luminance as the value representing the degree of severity of white balance.

Note that a subject map may be supplied from the subject map generation unit 46 to the exposure determination unit 52 and the white balance determination unit 53 and that the exposure determination process and the white balance determination process may be performed only on, as a target of processing, the region of the subject on the input image, which is specified by the subject map.

In step S20, the score calculation unit 54 calculates the score of the input image on the basis of the detection results respectively supplied from the blur determination unit 51, the exposure determination unit 52, and the white balance determination unit 53, and outputs the score.

For example, the score calculation unit 54 linearly combines the supplied detection results, namely, the value representing the blur degree, the value representing the degree of severity of exposure, and the value representing degree of severity of white balance, using predetermined weights, and uses a resulting value as the score for the input image.

In addition, the score calculation unit 54 may also be configured to output, together with the determined score, information indicating whether or not the input image is the best shot. In such a case, the input image is regarded as the best shot when the value of the determined score is greater than or equal to a predefined threshold value, and the input image is regarded as a bad shot when the score is less than the threshold value. When the score for the input image is output in this way, the image evaluation process ends.

The image processing apparatus 11 generates a subject map from an input image in the manner as above, and detects the blur degree of the region of the subject in the input image using the subject map. Then, the image processing apparatus 11 performs an evaluation of the input image in terms of the blur degree of the subject, the degree of severity of exposure, and the degree of severity of white balance of the input image.

In this manner, the blur degree of the region of the subject in the input image is detected using the subject map, and the score for the input image is determined on the basis of the detection result. This allows more reliable evaluation of the degree to which the subject on the input image is blurred, that is to say, the degree to which the subject appears sharp. Therefore, it is possible to more reliably determine whether or not an input image to be evaluated is an image estimated to be acceptable for a user to view, that is, the best shot, and to easily and reliably select only an input image with high evaluation.

Specifically, since the blur degree of the subject is taken into consideration for the scoring of the input image, in a case where it is estimated that the region of the subject on the input image is more blurred, the score of the input image is low regardless of whether or not the non-subject region (background) in the input image is blurred. That is, unless the region of the subject in the input image is blurred (as long as the subject is in focus), the score of the input image is high. Therefore, in a case where the background in the input image is in focus and the subject is blurred, the input image can be prevented from being erroneously determined to be the best shot because of its high score.

The use of a score determined in the manner as above would allow easy selection of only an input image regarded as the best shot from among a plurality of input images.

Next, the processes corresponding to the processing of steps S11 through S15 in FIG. 8 will be explained with reference to flowcharts of FIGS. 9 through 13, respectively.

First, the luminance information extraction process corresponding to the processing of step S11 in FIG. 8 will be explained with reference to the flowchart of FIG. 9.

In step S51, the luminance image generation unit 81 generates a luminance image using the supplied input image, and supplies the luminance image to the pyramid image generation unit 82. For example, the luminance image generation unit 81 multiplies the values of the respective R, G, and B components of a pixel in the input image by coefficients defined in advance for the respective components, and regards the sum of the values of the respective components multiplied by the coefficients as the pixel value of a pixel located in the luminance image at the same position as that of the pixel in the input image. That is, the luminance component of a component signal formed of the luminance component (Y) and the color difference components (Cb, Cr) is determined. Note that the average value of the values of the respective R, G, and B components of a pixel may be regarded as the pixel value of a pixel in the luminance image.

In step S52, the pyramid image generation unit 82 generates pyramid images in the respective layers of levels L1 through L8 on the basis of the luminance image supplied from the luminance image generation unit 81, and supplies the pyramid images to the difference calculation unit 83.

In step S53, the difference calculation unit 83 generates difference images using the pyramid images supplied from the pyramid image generation unit 82, normalizes the difference images, and supplies the results to the luminance information map generation unit 84. The normalization is performed so that pixel values of the pixels in the difference images can be values in the range of, for example, 0 through 255.

Specifically, the difference calculation unit 83 determines the difference between the pyramid images in each of combinations of layers of levels L6 and L3, levels L7 and L3, levels L7 and L4, levels L8 and L4, and levels L8 and L5 among the pyramid images in the respective layers of luminance. Accordingly, a total of five luminance difference images are obtained.

For example, in a case where the difference image of the combination of levels L6 and L3 is to be generated, the pyramid image of level L6 is up-converted in accordance with the size of the pyramid image of level L3. That is, the pixel value of one pixel in the pyramid image of level L6 before up-conversion is regarded as corresponding to the pixel values of some adjacent pixels corresponding to that pixel in the pyramid image of level L6 after up-conversion. Then, a difference between the pixel value of a pixel in the pyramid image of level L6 and the pixel value of a pixel located in the pyramid image of level L3 at the same position as that of the pixel is determined, and the difference is regarded as the pixel value of a pixel in the difference image.

The process for generating these difference images is equivalent to performing a filtering process on a luminance image using a band-pass filter to extract a designated frequency component from the luminance image. The pixel value of a pixel in the difference image obtained in this way represents the difference between the luminance values of the pyramid images of the respective levels, that is, the difference between the luminance of a designated pixel in the input image and the average luminance of neighboring pixels.

In general, a region having a large difference in luminance from the surrounding area in an image is a region that attracts the attention of a person viewing the image, and hence is probably the region of the subject. Therefore, pixels having larger pixel values in each difference image can be said to represent a region that is more probably the region of the subject.

In step S54, the luminance information map generation unit 84 generates a luminance information map on the basis of the difference image supplied from the difference calculation unit 83, and supplies the luminance information map to the subject map generation unit 46. When the luminance information map is supplied from the luminance information map generation unit 84 to the subject map generation unit 46, the luminance information extraction process ends, and the process proceeds to step S12 in FIG. 8.

For example, the luminance information map generation unit 84 performs weighted addition of the supplied five difference images with difference weights Wa that are predetermined weights for the respective difference images to determine one image. That is to say, the pixel values of pixels located in the respective difference images at the same position are multiplied by the corresponding difference weights Wa, and the sum total of the pixel values multiplied by the difference weights Wa is determined.

Note that at the time of the generation of a luminance information map, difference images are up-converted so that the individual difference images can have the same size.

In this way, the luminance information extraction unit 41 determines an luminance image from an input image, and generates a luminance information map from the luminance image. According to the luminance information map obtained in this way, it is possible to easily detect a region having a large difference in luminance in the input image, that is, a region noticeable to an observer who glances at the input image.

Next, the color information extraction process corresponding to the processing of step S12 in FIG. 8 will be explained with reference to the flowchart of FIG. 10.

In step S81, the RG difference image generation unit 111 generates an RG difference image using the supplied input image, and supplies the RG difference image to the pyramid image generation unit 113.

In step S82, the BY difference image generation unit 112 generates a BY difference image using the supplied input image, and supplies the BY difference image to the pyramid image generation unit 114.

In step S83, the pyramid image generation units 113 and 114 generate pyramid images using the RG difference image from the RG difference image generation unit 111 and the BY difference image from the BY difference image generation unit 112.

For example, the pyramid image generation unit 113 generates a plurality of RG difference images having resolutions different from each other to thereby generate pyramid images in respective layers of levels L1 through L8, and supplies the pyramid images to the difference calculation unit 115. Similarly, the pyramid image generation unit 114 generates a plurality of BY difference images having resolutions different from each other to thereby generate pyramid images in respective layers of levels L1 through L8, and supplies the pyramid images to the difference calculation unit 116.

In step S84, the difference calculation units 115 and 116 generate difference images on the basis of the pyramid images supplied from the pyramid image generation units 113 and 114, normalize the difference images, and supply the results to the color information map generation units 117 and 118. In the normalization of the difference images, for example, the pixel values of the pixels become values in the range of 0 through 255.

For example, the difference calculation unit 115 determines the difference between the pyramid images in each of combinations of layers of levels L6 and L3, levels L7 and L3, levels L7 and L4, levels L8 and L4, and levels L8 and L5 among the pyramid images of the RG differences in the respective layers. Accordingly, a total of five difference images of the RG differences are obtained.

Similarly, the difference calculation unit 116 determines the difference between the pyramid images in each of combinations of layers of levels L6 and L3, levels L7 and L3, levels L7 and L4, levels L8 and L4, and levels L8 and L5 among the pyramid images of the BY differences in the respective layers. Accordingly, a total of five difference images of BY differences are obtained.

The process for generating these difference images is equivalent to performing a filtering process on RG difference images or BY difference images using a band-pass filter to extract a designated frequency component from the RG difference images or the BY difference images. The pixel value of a pixel in the difference images obtained in this way represents a difference in specific color component between the pyramid images of the respective levels, that is, a difference between a specific color component in a pixel in the input image and the average specific color component of neighboring pixels.

In general, a region having a more pronounced color than that of the surrounding area in an image, that is, a region having a large difference in specific color component from the surrounding area, is a region that attracts the attention of a person viewing the image, and hence is probably the region of the subject. Therefore, pixels having larger pixel values in each difference image can be said to represent a region that is more probably the region of the subject.

In step S85, the color information map generation units 117 and 118 generate color information maps using the difference images from the difference calculation unit 115 and the difference images from the difference calculation unit 116, and supply the color information maps to the subject map generation unit 46.

For example, the color information map generation unit 117 performs weighted addition of the difference images of the RG differences supplied from the difference calculation unit 115 with the predetermined difference weights Wa for the respective difference images to produce one color information map of RG difference.

Similarly, the color information map generation unit 118 performs weighted addition of the difference images of the BY differences supplied from the difference calculation unit 116 with the predetermined difference weights Wa to produce one color information map of BY difference. Note that at the time of the generation of a color information map, difference images are up-converted so that the individual difference images can have the same size.

Figure 8:
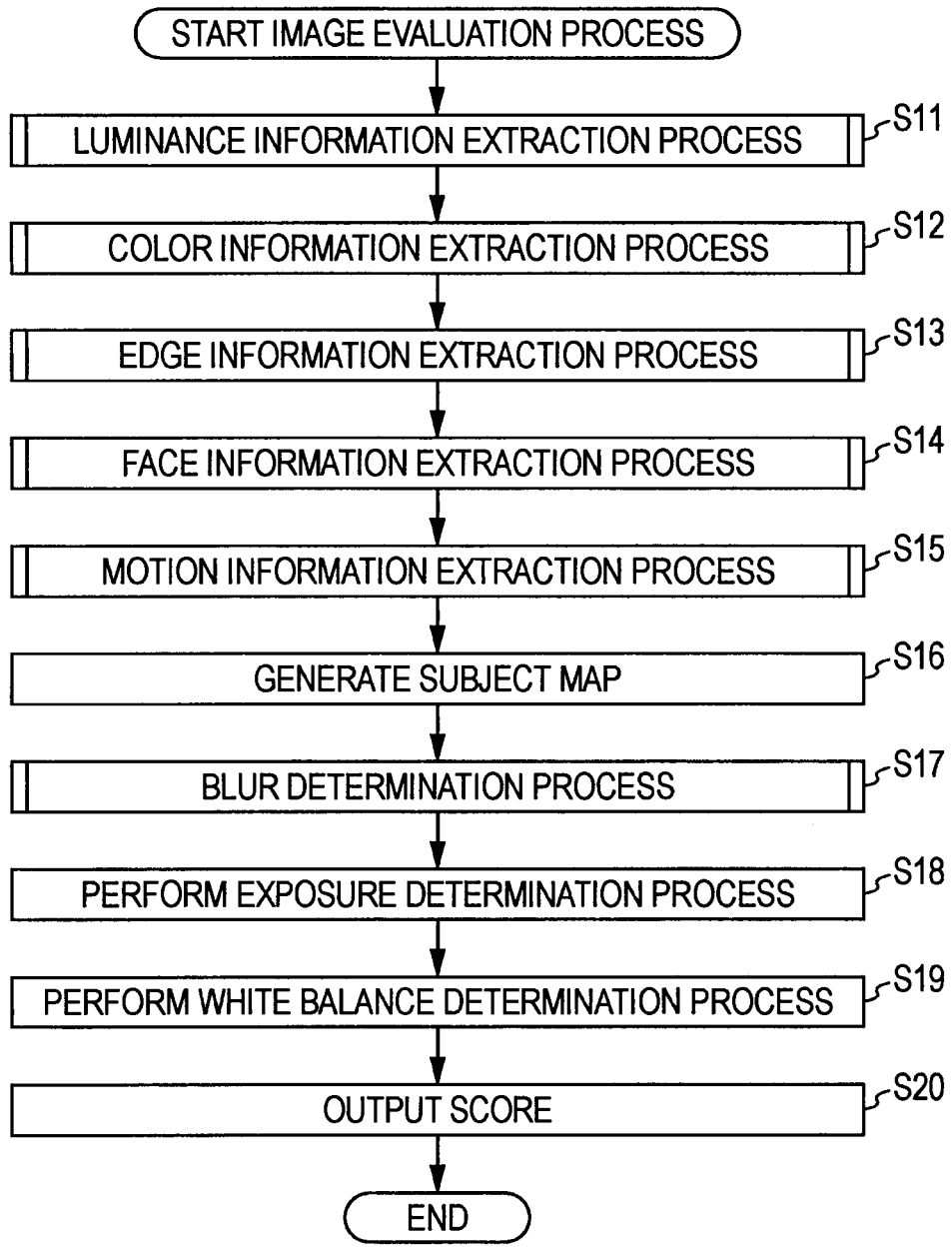
FIG. 8 is a flowchart explaining an image evaluation process.

When the color information map generation units 117 and 118 supply the color information map of RG difference and color information map of BY difference obtained in this way to the subject map generation unit 46, the color information extraction process ends, and the process proceeds to step S13 in FIG. 8.

In this way, the color information extraction unit 42 determines a difference image for a specific color component from the input image, and generates a color information map from the image. According to the color information map obtained in this way, it is possible to easily detect a region having a large difference in specific color component in the input image, that is, a region noticeable to an observer who glances at the input image.

Note that while an explanation has been given in which the difference between the R (red) component and the G (green) component and the difference between the B (blue) component and the Y (yellow) component are extracted as color information extracted from the input image, the color information extraction unit 42 may be configured such that the color difference components Cr and Cb or the like is extracted. Here, the color difference component Cr is the difference between the R component and the luminance component, and the color difference component Cb is the difference between the B component and the luminance component.

Figure 11:
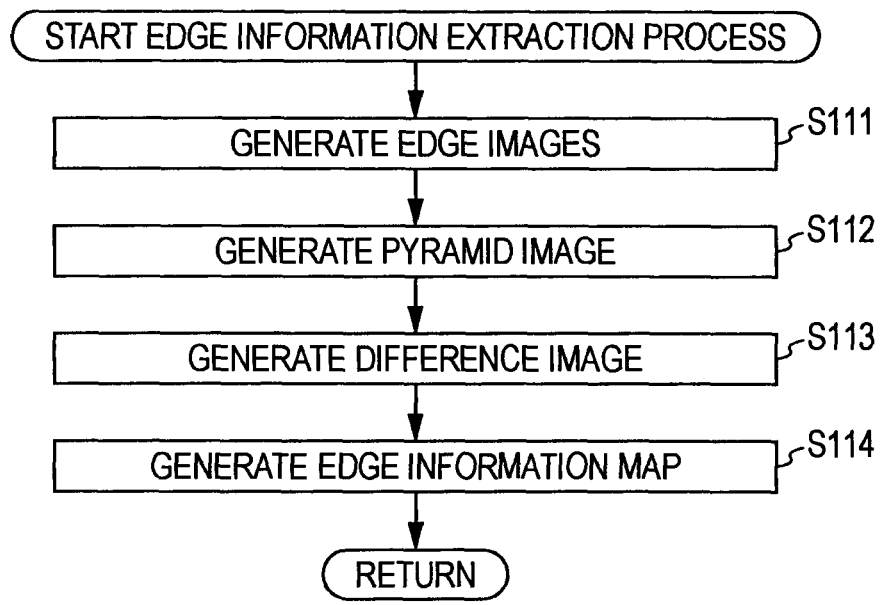
FIG. 11 is a flowchart explaining an edge information extraction process.

FIG. 11 is a flowchart explaining an edge information extraction process corresponding to the processing of step S13 in FIG. 8. This edge information extraction process will be explained hereinafter.

In step S111, the edge image generation units 141 through 144 perform a filtering process on the supplied input image using a Gabor filter to generate edge images in which the edge strengths in the directions of 0 degrees, 45 degrees, 90 degrees, and 135 degrees are used as the pixel values of a pixel. Then, the edge image generation units 141 through 144 supply the generated edge images to the pyramid image generation units 145 through 148.

In step S112, the pyramid image generation units 145 through 148 generate pyramid images using the edge images from the edge image generation units 141 through 144, and supply the pyramid images to the difference calculation units 149 through 152.

For example, the pyramid image generation unit 145 generates a plurality of edge images in the direction of 0 degrees having resolutions different from each other to thereby generate pyramid images in respective layers of levels L1 through L8, and supplies the pyramid images to the difference calculation unit 149. Similarly, the pyramid image generation units 146 through 148 generate pyramid images in respective layers of levels L1 through L8, and supply the pyramid images to the difference calculation units 150 through 152.

In step S113, the difference calculation units 149 through 152 generate difference images using the pyramid images from the pyramid image generation units 145 through 148, normalize the difference images, and supply the results to the edge information map generation units 153 through 156. In the normalization of the difference images, for example, the pixel values of the pixels become values in the range of 0 through 255.

For example, the difference calculation unit 149 determines the difference between the pyramid images in each of combinations of layers of levels L6 and L3, levels L7 and L3, levels L7 and L4, levels L8 and L4, and levels L8 and L5 among the edge pyramid images in the direction of 0 degrees in the respective layers supplied from the pyramid image generation unit 145. Accordingly, a total of five edge difference images are obtained.

Similarly, the difference calculation units 150 through 152 determine the difference between the pyramid images in each of combinations of layers of levels L6 and L3, levels L7 and L3, levels L7 and L4, levels L8 and L4, and levels L8 and L5 among the pyramid images in the respective layers. Accordingly, a total of five difference images for each of the edges in the respective directions are obtained.

The process for generating these difference images is equivalent to performing a filtering process on the edge images using a band-pass filter to extract a designated frequency component from edge images. The pixel value of a pixel in the difference images obtained in this way represents a difference in edge strength between the pyramid images in the respective levels, that is, a difference between the edge strength at a designated position in the input image and the average edge strength of neighboring positions.

In general, a region having a larger edge strength than that of the surrounding area in an image is a region that attracts the attention of a person viewing the image, and hence is probably the region of the subject. Therefore, pixels having larger pixel values in each difference image can be said to represent a region that is more probably the region of the subject.

In step S114, the edge information map generation units 153 through 156 generate edge information maps in the respective directions using the difference images from the difference calculation units 149 through 152, and supply the edge information maps to the subject map generation unit 46.

For example, the edge information map generation unit 153 performs weighted addition of the difference images supplied from the difference calculation unit 149 with the predetermined difference weights Wa to produce an edge information map in the direction of 0 degrees.

Similarly, the edge information map generation unit 154 performs weighted addition of the difference images from the difference calculation unit 150 with the difference weights Wa, the edge information map generation unit 155 performs weighted addition of the difference images from the difference calculation unit 151 with the difference weights Wa, and the edge information map generation unit 156 performs weighted addition of the difference images from the difference calculation unit 152 with the difference weights Wa. Accordingly, edge information maps in the respective directions of 45 degrees, 90 degrees, and 135 degrees are obtained. Note that at the time of the generation of an edge information map, difference images are up-converted so that the individual difference images can have the same size.

When the edge information map generation units 153 through 156 supply a total of four edge information maps in the respective directions obtained in this way to the subject map generation unit 46, the edge information extraction process ends, and the process proceeds to step S14 in FIG. 8.

In this way, the edge information extraction unit 43 determines a difference image for an edge in a specific direction from an input image, and generates an edge information map from the difference image. According to the edge information maps obtained in this way for the respective directions, it is possible to easily detect a region having a larger difference in edge strength in a specific direction than that of the surrounding area in the input image, that is, a region noticeable to an observer who glances at the input image.

Note that while an explanation has been given in which a Gabor filter is used for edge extraction, the edge information extraction process may be configured such that any other edge extraction filter such as a Sobel filter or a Roberts filter is used.

In addition, the method for extracting information such as luminance, colors, and edges from an image, which has been explained with reference to FIGS. 9 through 11, is described in detail in, for example, Laurent Itti, Christof Koch, and Ernst Niebur, "A Model of Saliency-Based Visual Attention for Rapid Scene Analysis".

Figure 12:
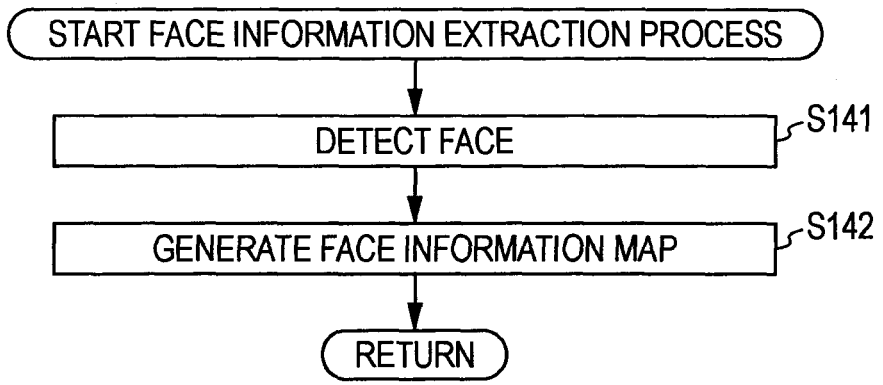
FIG. 12 is a flowchart explaining a face information extraction process.

Next, the face information extraction process corresponding to the processing of step S14 in FIG. 8 will be explained with reference to the flowchart of FIG. 12.

In step S141, the face detection unit 181 detects the region of a human face from the supplied input image, and supplies the detection result to the face information map generation unit 182. For example, the face detection unit 181 performs a filtering process on the input image using a Gabor filter to detect feature regions such as the human eye, mouth, and nose from the input image, and thereby detects a face region in the input image.

In step S142, the face information map generation unit 182 generates a face information map using the detection result from the face detection unit 181, and supplies the face information map to the subject map generation unit 46.

For example, it is assumed that a plurality of rectangular regions (hereinafter referred to as candidate regions) on the input image, which are estimated to include a face, have been detected as face detection results from the input image. Here, it is assumed that a plurality of candidate regions may be detected in the vicinity of a designated position on the input image and that some of these candidate regions may overlap each other. That is to say, for example, in a case where, with respect to the region of one face on the input image, a plurality of regions including this face are obtained as candidate regions, some of these candidate regions overlap each other.

The face information map generation unit 182 generates, with respect to the candidate regions obtained by face detection, a detection image having the same size as the input image for each of the candidate regions. In this detection image, the pixel value of a pixel in the same region as a candidate region serving as a target of processing on the detection image is regarded as a value greater than the pixel value of a pixel in a region different from the candidate region.

In addition, the pixel values of the pixels on the detection image are such that a pixel at the same position as that of a pixel in a candidate region that is estimated to more probably include a human face has a larger pixel value. The face information map generation unit 182 adds together the detection images obtained in this way to generate one image, and normalizes the image to produce a face information map. Therefore, a pixel on the face information map in the same region as a region in which some of the plurality of candidate regions overlap on the input image has a large pixel value, and the probability that a face is included becomes higher. Note that the normalization is performed so that pixel values of the pixels in the face information map can be values in the range of, for example, 0 through 255.

When a face information map is generated, the face information extraction process ends, and the process proceeds to step S15 in FIG. 8.

In this way, the face information extraction unit 44 detects a face from the input image, and generates a face information map from the detection result. According to the face information map obtained in this way, it is possible to easily detect the region of a human face serving as the subject in an input image.

Figure 13:
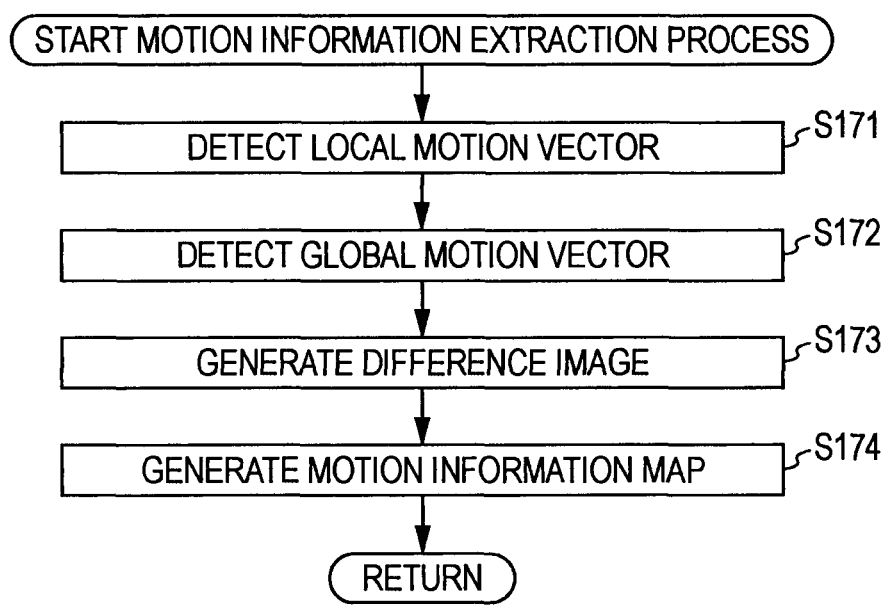
FIG. 13 is a flowchart explaining a motion information extraction process.

Furthermore, the motion information extraction process corresponding to the processing of step S15 in FIG. 8 will be explained with reference to the flowchart of FIG. 13.

In step S171, the local motion vector extraction unit 211 uses the supplied input image to detect a local motion vector of each pixel in the input image using a gradient method or the like, and supplies the local motion vector to the difference calculation unit 213.

In step S172, the global motion vector extraction unit 212 uses the supplied input image to detect a global motion vector, and supplies the global motion vector to the difference calculation unit 213.

In step S173, the difference calculation unit 213 determines the absolute value of the difference between the local motion vector from the local motion vector extraction unit 211 and the global motion vector from the global motion vector extraction unit 212 to generate a motion difference image. Then, the difference calculation unit 213 supplies the generated motion difference image to the motion information map generation unit 214.

In step S174, the motion information map generation unit 214 normalizes the difference image supplied from the difference calculation unit 213 to produce a motion information map, and supplies the motion information map to the subject map generation unit 46. Here, the normalization of a difference image is performed so that pixel values of the respective pixels can be values in the range of, for example, 0 through 255. When a motion information map is generated, the motion information extraction process ends, and the process proceeds to step S16 in FIG. 8.

In this way, the motion information extraction unit 45 detects a motion from the input image, and generates a motion information map from the detection result. According to the motion information map obtained in this way, it is possible to easily detect the region of a moving object in an input image. The region of a moving object in an input image is a region noticeable to an observer who glances at the input image, and can probably be that of the subject.

With the luminance information extraction process through motion information extraction process explained as above, respective information maps are obtained and a subject map is generated from these information maps.

Figure 14:
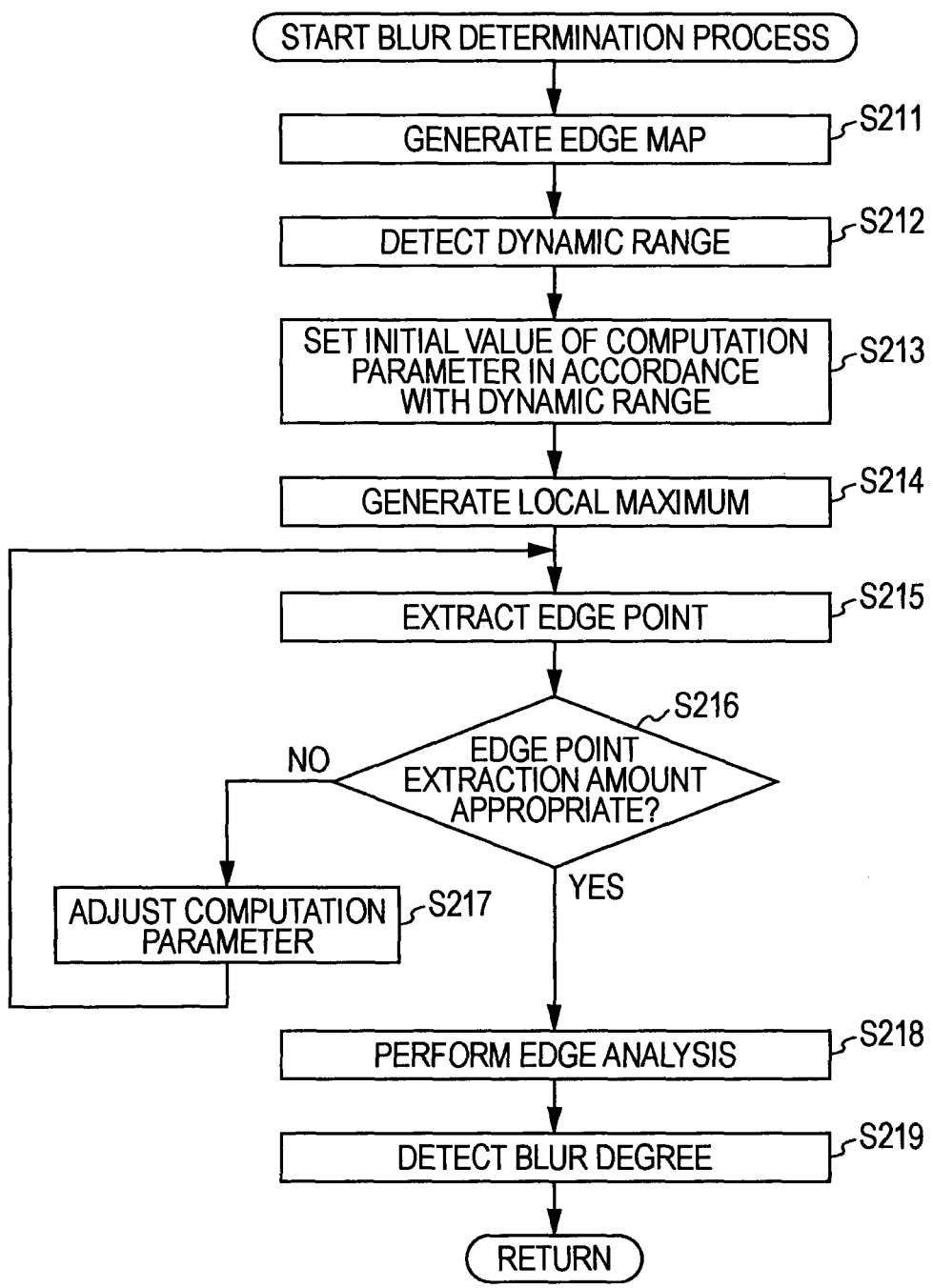
FIG. 14 is a flowchart explaining a blur determination process.

Next, the blur determination process corresponding to the processing of step S17 in FIG. 8 will be explained with reference to a flowchart of FIG. 14.

In step S211, the edge map generation unit 241 generates an edge map using the supplied input image and the subject map from the subject map generation unit 46.

Specifically, the edge map generation unit 241 extracts a subject image from the input image using the subject map. That is to say, the region of a pixel in the input image, which is the same as a pixel whose pixel value is greater than or equal to a designated value on the subject map, is regarded as the region of the subject on the input image, and a region having a designated size on the input image, which includes that region, is regarded as a subject image.

In addition, the edge map generation unit 241 divides the subject image into blocks each having a size of 2×2 pixels, and calculates absolute values $M_{TL-TR}$ through $M_{BL-BR}$ of the differences between the pixel values of the pixels in each block using equations (1) through (6) as follows.

[Math. 1]

$$M_{TL-TR} = |a-b| \quad (1)$$

$$M_{TL-BL} = |a-c| \quad (2)$$

$$M_{TL-BR} = |a-d| \quad (3)$$

$$M_{TR-BL} = |b-c| \quad (4)$$

$$M_{TR-BR} = |b-d| \quad (5)$$

$$M_{BL-BR} = |c-d| \quad (6)$$

Figure 15:
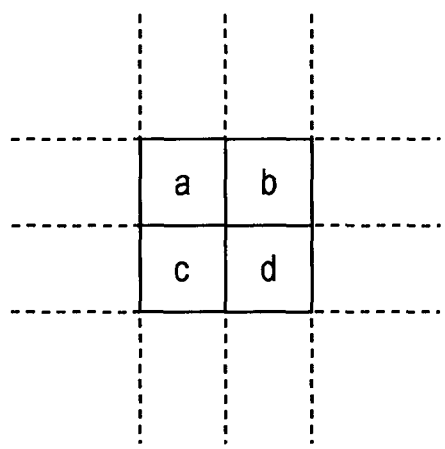
FIG. 15 is a diagram explaining the generation of an edge map.

Note that in equations (1) through (6), each of a, b, c, and d represents the pixel value of a pixel in a block having a size of 2×2 pixels of the subject image. For example, as illustrated in FIG. 15, the pixel value a represents the pixel value of an upper left pixel in the block illustrated in the figure. In addition, the pixel value b represents the pixel value of an upper right pixel in the block illustrated in the figure, the pixel value c represents the pixel value of a lower left pixel in the block, and the pixel value d represents the pixel value of a lower right pixel in the block.

Next, the edge map generation unit 241 calculates the average value $M_{Ave}$ of the absolute values $M_{TL-TR}$ through $M_{BL-BR}$ using equation (7) below. This average value $M_{Ave}$ represents the average value of the edge strengths in the vertical, horizontal, and diagonal directions in the block.

[Math. 2]

$$M_{Ave} = \frac{M_{TL-TR} + M_{TL-BL} + M_{TL-BR} + M_{TR-BL} + M_{TR-BR} + M_{BL-BR}}{6} \quad (7)$$

The edge map generation unit 241 arranges the calculated average values $M_{Ave}$ in the same order as that of the corresponding blocks in the subject image to thereby generate the edge map at scale SC1.

Furthermore, in order to generate the edge maps at scales SC2 and SC3, the edge map generation unit 241 generates an averaged image at scales SC2 and SC3 using equation (8) as follows.

[Math. 3]

$$p_{(m,n)}^{i+1} = \frac{p_{(2m,2n)}^{i} + p_{(2m,2n+1)}^{i} + p_{(2m+1,2n)}^{i} + p_{(2m+1,2n+1)}^{i}}{4} \quad (8)$$

Note that in equation (8), $P^i(x, y)$ represents the pixel value of a pixel located at coordinates (x, y) in an averaged image at scale SCi (where $1 \leq i \leq 3$). In addition, $P^{i+1}(x, y)$ represents the pixel value of a pixel located at coordinates (x, y) in an averaged image at scale SCi+1. Note that it is assumed that an averaged image at scale SC1 is a subject image. Therefore, an averaged image at scale SC2 is an image in which an average value of pixel values of pixels in each of blocks obtained when the subject image is divided into blocks each having a size of 2×2 pixels is used as the pixel value of one pixel. In addition, an averaged image at scale SC3 is an image in which an average value of pixel values of pixels in each of blocks obtained when the averaged image at scale SC2 is divided into blocks each having a size of 2×2 pixels is used as the pixel value of one pixel.

The edge map generation unit 241 performs processes, which are similar to those performed on the subject image respectively using equations (1) through (7), on the averaged images at scales SC2 and SC3 to generate edge maps at scales SC2 and SC3.

Therefore, the edge maps at scales SC1 through SC3 become images obtained by extracting edge components of different frequency bands from the input image. Note that the number of pixels of the edge map at scale SC1 is equal to ¼ (vertically ½×horizontally ½) that of the subject image, that the number of pixels of the edge map at scale SC2 is equal to 1/16 (vertically ¼×horizontally ¼) that of the subject image, and that the number of pixels of the edge map at scale SC3 is equal to 1/64 (vertically ⅛×horizontally ⅛) that of the subject image.

The edge map generation unit 241 supplies the generated edge maps at scales SC1 through SC3 to the dynamic range detection unit 242 and the local maximum generation unit 244. In this manner, edge maps at different scales are generated in units of blocks of different sizes, which can thus avoid variations in edge strength.

In step S212, the dynamic range detection unit 242 detects the dynamic range of the subject image using the edge maps supplied from the edge map generation unit 241, and supplies the detection result to the computation parameter adjustment unit 243.

Specifically, the dynamic range detection unit 242 detects a maximum pixel value and a minimum pixel value from among the edge maps at scales SC1 through SC3, and sets a value obtained by subtracting the detected minimum pixel value from the detected maximum pixel value as the dynamic range of edge strength of the subject image. That is to say, the difference between the maximum value and the minimum value of edge strength of the subject image is detected as the dynamic range.

Note that other methods than described above can also be conceived. For example, a dynamic range for each edge map may be detected and a maximum value, an average value, or the like of the detected dynamic ranges may be adopted as a dynamic range for actual use.

In step S213, the computation parameter adjustment unit 243 sets an initial value of a computation parameter in accordance with the dynamic range supplied from the dynamic range detection unit 242.

That is to say, the computation parameter adjustment unit 243 determines that the subject image is a low dynamic range image in a case where the dynamic range is less than a designated threshold value, and determines that the subject image is a high dynamic range image in a case where the dynamic range is greater than or equal to the threshold value.

Then, in a case where the subject image is a low dynamic range image, the computation parameter adjustment unit 243 sets the computation parameter to an initial value for a low dynamic range image. In addition, in a case where the subject image is a high dynamic range image, the computation parameter adjustment unit 243 sets the computation parameter to an initial value for a high dynamic range image.

Here, it is estimated that the low dynamic range image has a smaller number of edges than the high dynamic range image and has a smaller amount of edge points to be extracted. Therefore, an initial value of an edge reference value for a low dynamic range image is set to be smaller than an initial value of an edge reference value for a high dynamic range image so that a sufficient amount of edge points to keep the detection accuracy of the blur degree of the subject image at a certain level or higher can be extracted. In addition, an initial value of an extraction reference value for a low dynamic range image is set to be smaller than an initial value of an extraction reference value for a high dynamic range image.

The computation parameter adjustment unit 243 supplies the edge reference value set in accordance with the dynamic range to the edge point extraction unit 245, and supplies the edge reference value and the extraction reference value to the extraction amount determination unit 246.

In step S214, the local maximum generation unit 244 generates a local maximum using the edge map supplied from the edge map generation unit 241, and supplies the local maximum to the edge point extraction unit 245 and the edge analysis unit 247.

Figure 16:
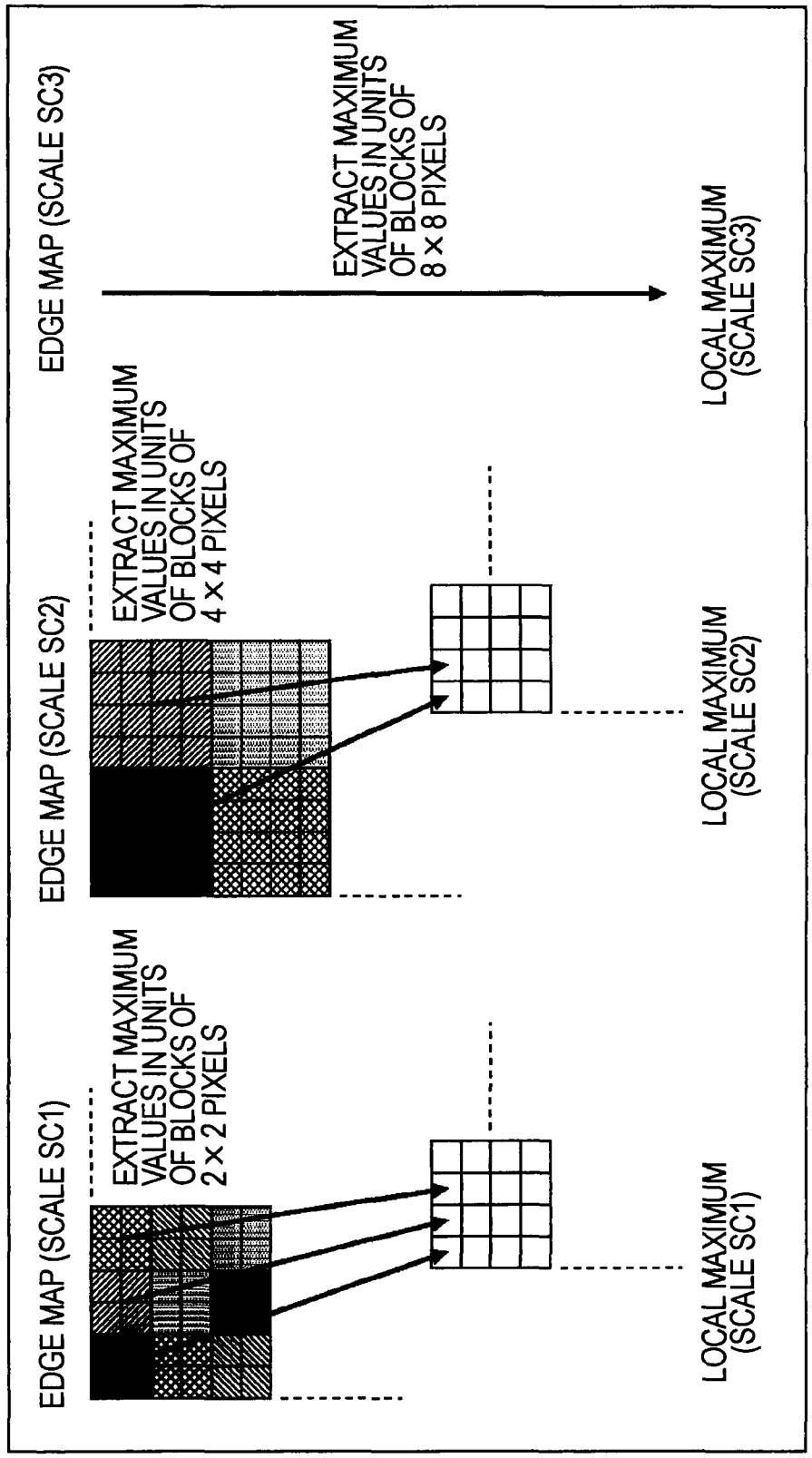
FIG. 16 is a diagram explaining the generation of local maxima.

For example, as illustrated in the left side of FIG. 16, the local maximum generation unit 244 divides the edge map at scale SC1 into blocks of 2×2 pixels. Then, the local maximum generation unit 244 extracts maximum values in the individual blocks of the edge map, and arranges the extracted maximum values in the same order as that of the corresponding blocks, thereby generating local maxima LM1 at scale SC1. That is, a maximum value of pixel values of pixels in each block is extracted.

In addition, as illustrated in the center in the figure, the local maximum generation unit 244 divides the edge map at scale SC2 into blocks of 4×4 pixels. Then, the local maximum generation unit 244 extracts maximum values in the individual blocks of the edge map, and arranges the extracted maximum values in the same order as that of the corresponding blocks, thereby generating local maxima LM2 at scale SC2.

Furthermore, as illustrated in the right side in the figure, the local maximum generation unit 244 divides the edge map at scale SC3 into blocks of 8×8 pixels. Then, the local maximum generation unit 244 extracts maximum values in the individual blocks of the edge map, and arranges the extracted maximum values in the same order as that of the corresponding blocks, thereby generating local maxima LM3 at scale SC3.

In step S215, the edge point extraction unit 245 extracts an edge point from the region of the subject in the subject image using the local maxima supplied from the local maximum generation unit 244 and the subject map supplied from the subject map generation unit 46.

Specifically, the edge point extraction unit 245 refers to the subject map to select one of the pixels in the region of the subject in the subject image, and uses the selected pixel as a pixel of interest. Note that the region of the subject on the subject image is regarded as a region having pixels located on the subject image at the same positions as those of pixels on the subject map whose pixel values are greater than or equal to a designated value.

In addition, assuming that the coordinates of the selected pixel of interest on the subject image in the xy coordinate system are expressed as (x, y), the edge point extraction unit 245 determines the coordinates (x1, y1) of a pixel corresponding to the pixel of interest in the local maxima LM1 using equation (9) as follows.

$$(x1, y1) = (x/4, y/4) \quad (9)$$

Note that it is assumed that, in equation (9), the figures after the decimal point in the values of x/4 and y/4 are rounded down.

Since one pixel in the local maxima LM1 is generated from a block of 4×4 pixels in the subject image, the coordinates of a pixel in the local maxima LM1, which corresponds to the pixel of interest in the subject image, have values that are respectively ¼ those of the x coordinate and the y coordinate of the pixel of interest.

Similarly, the edge point extraction unit 245 determines the coordinates (x2, y2) of a pixel corresponding to the pixel of interest in the local maxima LM2, and the coordinates (x3, y3) of a pixel corresponding to the pixel of interest in the local maxima LM3 using equations (10) and (11) as follows.

$$(x2, y2) = (x/16, y/16) \quad (10)$$

$$(x3, y3) = (x/64, y/64) \quad (11)$$

Note that it is assumed that, in equations (10) and (11), the figures after the decimal point in the values of x/16, y/16, x/64, and y/64 are rounded down.

Furthermore, in a case where the pixel value of the pixel at the coordinates (x1, y1) in the local maxima LM1 is greater than or equal to the edge reference value, the edge point extraction unit 245 extracts the pixel of interest as an edge point in the local maxima LM1. Then, the edge point extraction unit 245 stores the coordinates (x, y) of the pixel of interest and the pixel value at the coordinates (x1, y1) in the local maxima LM1 in association with each other.

Similarly, in a case where the pixel value of the pixel at the coordinates (x2, y2) in the local maxima LM2 is greater than or equal to the edge reference value, the edge point extraction unit 245 extracts the pixel of interest as an edge point in the local maxima LM2, and stores the coordinates (x, y) of the pixel of interest and the pixel value at the coordinates (x2, y2) in the local maxima LM2 in association with each other. In addition, in a case where the pixel value of the pixel at the coordinates (x3, y3) in the local maxima LM3 is greater than or equal to the edge reference value, the edge point extraction unit 245 extracts the pixel of interest as an edge point in the local maxima LM3, and stores the coordinates (x, y) of the pixel of interest and the pixel value at the coordinates (x3, y3) in the local maxima LM3 in association with each other.

The edge point extraction unit 245 repeats the above process until all the pixels in the region of the subject within the subject image have been regarded as pixels of interest.

Accordingly, pixels included in a block having an edge strength greater than or equal to the edge reference value among the blocks of 4×4 pixels in the region of the subject on the subject image are extracted as edge points on the basis of the local maxima LM1.

Similarly, pixels included in a block having an in-block edge strength greater than or equal to the edge reference value among the blocks of 16×16 pixels in the region of the subject on the subject image are extracted as edge points on the basis of the local maxima LM2. In addition, pixels included in a block having an in-block edge strength greater than or equal to the edge reference value among the blocks of 64×64 pixels in the region of the subject on the subject image are extracted as edge points on the basis of the local maxima LM3.

Therefore, pixels included in at least one of the blocks of 4×4 pixels, 16×16 pixels, or 64×64 pixels in the region of the subject, in which the edge strength becomes greater than or equal to the edge reference value, are extracted as edge points.

The edge point extraction unit 245 generates an edge point table ET1 that is a table in which the coordinates (x, y) of the edge points extracted on the basis of the local maxima LM1 and the pixel values of pixels corresponding to the edge points in the local maxima LM1 are associated with each other.

Similarly, the edge point extraction unit 245 generates an edge point table ET2 in which the coordinates (x, y) of the edge points extracted on the basis of the local maxima LM2 and the pixel values of pixels corresponding to the edge points in the local maxima LM2 are associated with each other. In addition, the edge point extraction unit 245 also generates an edge point table ET3 in which the coordinates (x, y) of the edge points extracted on the basis of the local maxima LM3 and the pixel values of pixels corresponding to the edge points in the local maxima LM3 are associated with each other.

Then, the edge point extraction unit 245 supplies these generated edge point tables to the extraction amount determination unit 246.

In step S216, the extraction amount determination unit 246 uses the edge point tables supplied from the edge point extraction unit 245 to determine whether or not the edge point extraction amount is appropriate. For example, in a case where the total number of edge points extracted, that is to say, the sum of the number of data items in the edge point tables ET1 through ET3, is less than the extraction reference value supplied from the computation parameter adjustment unit 243, it is determined that the edge point extraction amount is not appropriate.

In a case where it is determined in step S216 that the edge point extraction amount is not appropriate, the extraction amount determination unit 246 notifies the computation parameter adjustment unit 243 that the edge point extraction amount is not appropriate, and the process proceeds to step S217.

In step S217, the computation parameter adjustment unit 243 adjusts the computation parameter in accordance with a notification from the extraction amount determination unit 246.

For example, the computation parameter adjustment unit 243 reduces the edge reference value by a designated value with respect to the value set at the present time so that a larger number of edge points than that at the present time can be extracted. The computation parameter adjustment unit 243 supplies the adjusted edge reference value to the edge point extraction unit 245 and the extraction amount determination unit 246.

When the computation parameter is adjusted, thereafter, the process returns to step S215, and the process described above is repeated until it has been determined that the edge point extraction amount is appropriate.

In addition, in a case where it is determined in step S216 that the edge point extraction amount is appropriate, the extraction amount determination unit 246 supplies the edge reference value from the computation parameter adjustment unit 243 and the edge point tables to the edge analysis unit 247, and the process proceeds to step S218.

With the above process, in order to improve the detection accuracy of the blur degree, with regard to a low dynamic range subject image, edge points are also extracted from a block having a weak edge strength so that a sufficient amount of edge points to keep the detection accuracy of the blur degree of the subject at a certain level or higher can be maintained. With regard to a high dynamic range subject image, on the other hand, edge points are extracted from a block having as strong an edge strength as possible so that edge points forming a stronger edge can be extracted.

In step S218, the edge analysis unit 247 performs edge analysis using the edge reference value and edge point tables supplied from the extraction amount determination unit 246 and the local maxima supplied from the local maximum generation unit 244.

Specifically, the edge analysis unit 247 sets one of the edge points extracted from the subject image as a pixel of interest on the basis of the edge point tables ET1 through ET3. Then, assuming that the coordinates of the pixel of interest in the xy coordinate system are expressed as (x, y), the edge analysis unit 247 determines the coordinates (x1, y1) through (x3, y3) of pixels corresponding to the pixel of interest in the local maxima LM1 through LM3 using equations (9) through (11) described above.

The edge analysis unit 247 sets the maximum value of pixel values of pixels in a block of m×m pixels (for example, 4×4 pixels) on the local maxima LM1, in which the pixel at the coordinates (x1, y1) in the local maxima LM1 is used as the pixel at the upper left corner, to Local Max1(x1, y1). In addition, the edge analysis unit 247 sets the maximum value of pixel values in a block of n×n pixels (for example, 2×2 pixels), in which the pixel at the coordinates (x2, y2) in the local maxima LM2 is used as the pixel at the upper left corner, to Local Max2(x2, y2), and sets the pixel value at the coordinates (x3, y3) in the local maxima LM3 to Local Max3(x3, y3).

Note that the parameter m×m, which is used for the setting of Local Max1(x1, y1), and the parameter n×n, which is used for the setting of Local Max2(x2, y2), are parameters for adjusting the difference in size between blocks in the subject image, which correspond to one pixel in the local maxima LM1 through LM3.

The edge analysis unit 247 determines whether or not Local Max1(x1, y1), Local Max2(x2, y2), and Local Max3(x3, y3) satisfy condition expression (12) below. In a case where Local Max1(x1, y1), Local Max2(x2, y2), and Local Max3(x3, y3) satisfy conditional expression (12), the edge analysis unit 247 increments the value of a variable Nedge by one.

[Math. 4]

Local max1$(x1,y1)$>Edge Reference Value or

Local max2$(x2,y2)$>Edge Reference Value or

Local max1$(x3,y3)$>Edge Reference Value  (12)

Figure 17:
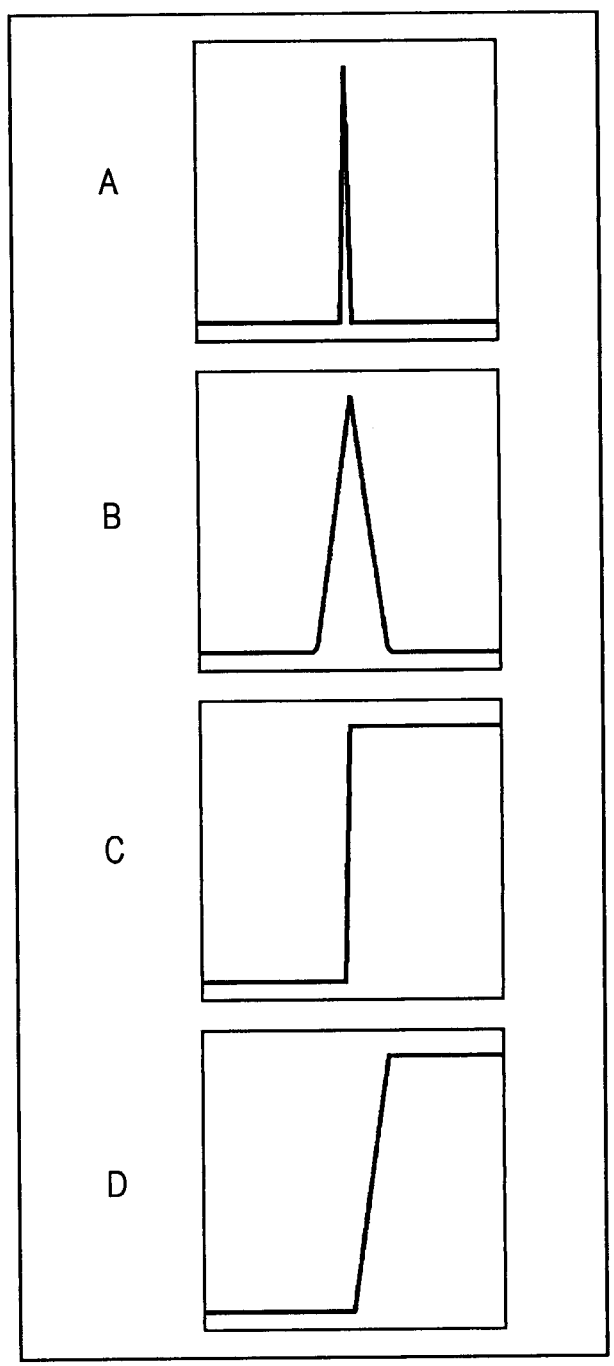
FIG. 17 is a diagram illustrating examples of edge structures.

Note that edge points satisfying conditional expression (12) are estimated to be edge points forming edges having a certain degree or more of strength, such as edges illustrated in parts A through D of FIG. 17, regardless of their structure.

Here, the edge illustrated in part A of FIG. 17 is regarded as a rapid impulse-like edge, the edge illustrated in part B of FIG. 17 is regarded as a pulse-like edge with a gradient smaller than that of the edge in part A of FIG. 17, and the edge illustrated in part C of FIG. 17 is regarded as a step-like edge with a gradient almost at the right angle. In addition, the edge illustrated in part D of FIG. 17 is regarded as a step-like edge with a gradient smaller than that of the edge in part C of FIG. 17.

In a case where Local Max1(x1, y1), Local Max2(x2, y2), and Local Max3(x3, y3) satisfy conditional expression (12), furthermore, the edge analysis unit 247 determines whether or not they satisfy conditional expression (13) or (14) below. In a case where Local Max1(x1, y1), Local Max2(x2, y2), and Local Max3(x3, y3) satisfy conditional expression (13) or (14), the edge analysis unit 247 increments the value of a variable Nsmallblur by one.

[Math. 5]

Local max1$(x1,y1)$<Local max2$(x2,y2)$<Local max1 $(x3,y3)$  (13)

Local max2$(x2,y2)$>Local max1$(x1,y1)$ and $$\text{Local max2}(x2, y2) > \text{Local max1}(x3, y3) \quad (14)$$

Note that an edge point satisfying conditional expression (12) and also satisfying conditional expression (13) or (14) is estimated to be an edge point forming an edge having the structure in part B or D of FIG. 17 with a strength weaker than that of the edge in part A or C of FIG. 17 although it has a certain degree or more of strength.

Furthermore, in a case where Local Max1(x1, y1), Local Max2(x2, y2), and Local Max3(x3, y3) satisfy conditional expression (12) and also satisfy conditional expression (13) or (14), the edge analysis unit 247 determines whether or not Local Max1(x1, y1) satisfies conditional expression (15) below. In a case where Local Max1(x1, y1) satisfies conditional expression (15), the edge analysis unit 17 increments the value of a variable Nlargeblur by one.

[Math. 6]

$$\text{Local max1}(x1, y1) < \text{Edge Reference Value} \quad (15)$$

Note that an edge point satisfying conditional expression (12), also satisfying conditional expression (13) or (14), and further satisfying conditional expression (15) is estimated to be an edge point forming an edge with lack of sharpness because of the occurrence of blur among edges having the structure in part B or D of FIG. 17 with a certain degree or more of strength. In other words, it is estimated that blur occurs in this edge point.

The edge analysis unit 247 repeats the above process until all the edge points extracted from the subject image have been regarded as pixels of interest. Accordingly, among the extracted edge points, the number of edge points Nedge, the number of edge points Nsmallblur, and the number of edge points Nlargeblur are determined.

Here, the number Nedge is the number of edge points satisfying conditional expression (13), and the number Nsmallblur is the number of edge points satisfying conditional expression (12) and also satisfying conditional expression (13) or (14). In addition, the number Nlargeblur is the number of edge points satisfying conditional expression (12), also satisfying conditional expression (13) or (14), and further satisfying conditional expression (15).

The edge analysis unit 247 supplies the calculated numbers Nsmallblur and Nlargeblur to the blur degree detection unit 248.

In step S219, the blur degree detection unit 248 computes equation (16) below using the numbers Nsmallblur and Nlargeblur from the edge analysis unit 247 to detect a blur degree BlurEstimation serving as an index of the blur extent of the subject in the input image.

[Math. 7]

$$\text{BlurEstimation} = \frac{N_{largeblur}}{N_{smallblur}} \quad (16)$$

That is to say, the blur degree BlurEstimation is the ratio of edge points estimated to form edges in which blur occurs to edge points estimated to form edges having the structure in FIG. 17B or 17D with a certain degree or more of strength. Therefore, it is estimated that the greater the blur degree BlurEstimation, the higher the blur extent of the subject whereas, the smaller the blur degree BlurEstimation, the smaller the blur extent of the subject.

When the blur degree BlurEstimation is determined, the blur degree detection unit 248 determines a blur degree having a greater value for a smaller blur extent of the subject as a final blur degree on the basis of the blur degree BlurEstimation. Then, the blur degree detection unit 248 supplies the determined final blur degree to the score calculation unit 54, and the blur determination process ends. The process proceeds to step S18 in FIG. 8.

Here, the reason why a blur degree having a greater value for a smaller blur extent of the subject is determined as a final blur degree is that the smaller the blur extent of the subject is, the larger the score of the input image is regarded as being.

As above, the blur determination unit 51 calculates the blur degree representing the blur extent of the region of the subject on the input image from the input image and the subject map. At the time of the calculation of the blur degree, the condition under which edge points are extracted and the amount of extraction of edge points are appropriately controlled in accordance with a subject image, thus allowing higher accuracy detection of the blur extent of the subject.

In addition, the detection of the blur extent for the region of the subject using a subject map allows reliable detection of the blur extent of the subject regardless of the subject such as that of a portrait picture or a landscape picture. Moreover, since the target of detection of the blur extent can only be for the region of the subject, thus allowing an increase in speed, which is about 1.5 times that obtained using the existing method of detecting the blur extent of the subject using a wavelet transform.

Note that while the foregoing explanation has given in which a subject map is generated and the region of the subject on an input image is specified, the method for specifying the region of the subject on an input image is not limited to a subject map and any other method may be used. For example, an object in the so-called gold line on an input image may be detected as the subject, or a human face detected from an input image may be detected as the subject.

In addition, the process for determining the blur degree of the region of the subject on an input image may be performed using any method. For example, edge points forming edges in the region of the subject on an input image may be extracted using a wavelet transform, and the types of the edge points may be analyzed to determine the blur degree of the subject.

Such a method for detecting the blur degree of the subject utilizing a wavelet transform is described in, for example, Hanghang Tong, Mingjing Li, Hongjiang Zhang and Changshui Zhang, "Blur Detection for Digital Images Using Wavelet Transform" or the like.

Furthermore, the detection of the blur degree of the subject in the region of the subject on an input image, which is used as a target of processing, has been explained. However, in a case where the subject is not detected from an input image, for example, in a case where a subject map does not include a pixel having a value greater than or equal to a designated value, the entire input image may be regarded as the process treatment and the blur degree of the entire input image may be determined. The blur degree of the input image determined in such a manner is supplied to the score calculation unit 54 and is used for the calculation of the score of the input image.

[Overview of Learning of Weight]

Incidentally, the image processing apparatus 11 detects the subject from an input image, and determines the score of the input image while taking the blurriness of the region of the subject on the input image into consideration.

Conventionally, a method for separating a foreground and a background on an image (see, for example, Japanese Unexamined Patent Application Publication No. 2003-16448) is known as a method for detecting the subject from an image. In this method, a segmentation process of dividing an image into a plurality of blocks and merging similar blocks using colors and luminance is performed to separate an image into a foreground and a background. In addition, as a method for detecting the subject from an image, there is also a method for detecting a face or skin color region from the image as the region of the subject (see, for example, Japanese Unexamined Patent Application Publication No. 2004-72655).

However, it has been difficult to reliably detect the subject from an image using these techniques.

For example, in the method in which a face or skin color region on an image is regarded as the region of the subject, only a human face or human skin can be detected as the subject. Thus, in a case where an animal, a plant, a building, and the like are the subjects, these subjects could not be detected from images.

In addition, in the method of separating an image into a foreground and a background, since the separation between the foreground and the background is performed in terms of similarity of color or luminance between individual blocks, a region regarded as the foreground may not necessarily be the region of the subject. Furthermore, since segmentation is performed on a block-by-block basis, there is a risk that the presence or absence of texture on an image cannot accurately be determined, and there has been a case where the subject cannot be reliably detected.

In contrast, the image processing apparatus 11 extracts a plurality of pieces of information estimated to have a larger number of regions of the subjects from an input image, and generates a subject map using these pieces of information, thereby being capable of more reliably detecting the region of the subject from the input image. Moreover, since the pixel values of the subject map are larger for a region on the input image to which it is more estimated that an observer who glances at an input image directs his/her eye, the subject, which is not only a human but also a general object such as an animal, a plant, or a building, can be detected.

Such a subject map is generated through the extraction of pieces of information such as luminance, colors, edges, a face, and a motion from an input image. That is to say, difference images obtained from pyramid images of these extracted pieces of information are subjected to weighted addition with difference weights Wa to produce information maps, and these information maps are subjected to weighted addition with information weights Wb. Then, furthermore, the resulting images (maps) are multiplied by a subject weight Wc to produce a subject map.

These difference weights Wa, information weights Wb, and subject weight Wc used at the time of the generation of a subject map are determined using, for example, neural-network-based learning. With the use of, as a learning image used at the time of the learning of these weights, an image including not only a human but also a general subject, a general subject can be more reliably detected from an input image using a subject map generated using weights obtained by learning.

The learning of the difference weights Wa, the information weights Wb, and the subject weight Wc, which are used to generate a subject map, will be hereinafter explained.

First, an overview of neural-network-based learning will be explained with reference to FIGS. 18 and 19.

Figure 18:
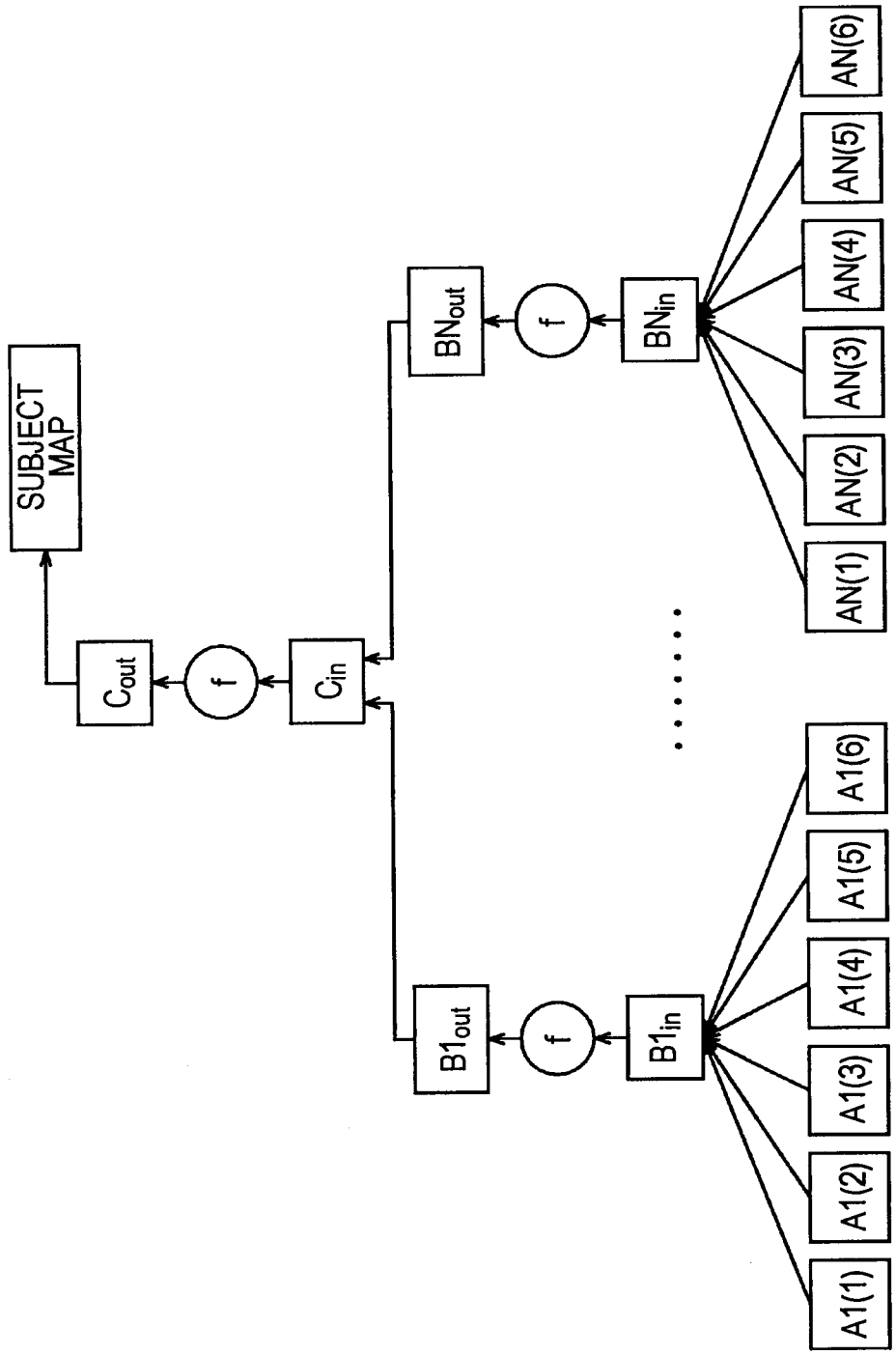
FIG. 18 is a diagram explaining an overview of neural-network-based learning.
Figure 19:
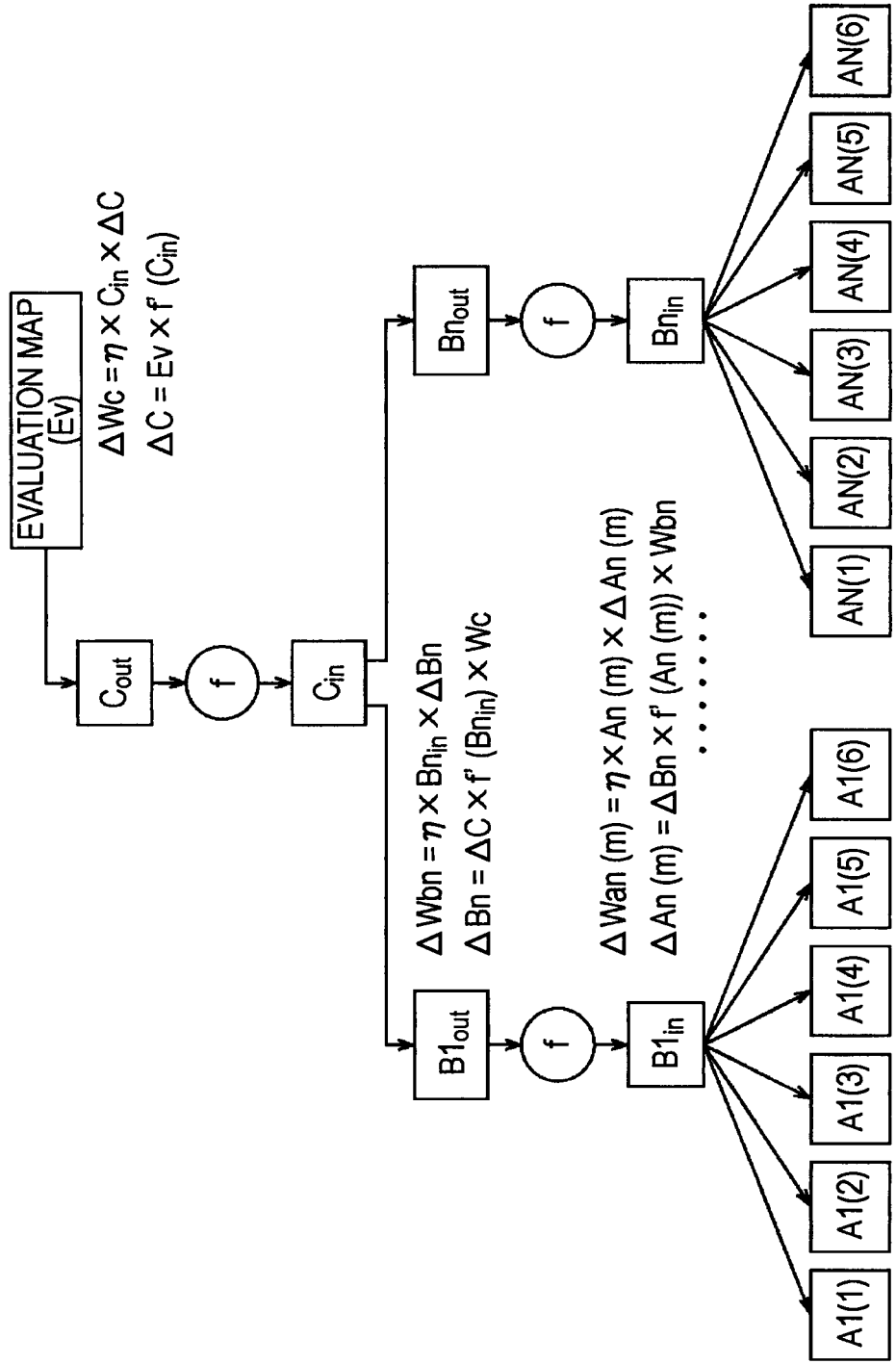
FIG. 19 is a diagram explaining an overview of neural-network-based learning.

At the time of learning, as illustrated in FIG. 18, the difference weights Wa, the information weights Wb, and the subject weight Wc, which are given initial values, and a learning image including the subject are used, and a subject map is generated.

Specifically, a difference image An(m) (where $1 \leq n \leq N$, $1 \leq m \leq 6$) for each piece of information extracted at the time of the generation of a subject map is generated from a learning image. Here, difference images An(1) through An(6) are difference images about a piece of information extracted from the learning image.

For example, the difference images A1(1) through A1(6) are regarded as luminance difference images that are generated using pyramid images of luminance obtained from the learning image. In addition, for example, difference images AN(1) through AN(6) are regarded as difference images in a direction of 0 degrees, which are generated using pyramid images of edges in the direction of 0 degrees obtained from the learning image.

Note that in FIG. 18, an example in which six difference images are obtained for each piece of information extracted from the learning image is illustrated; however, any number of difference images may be used.

When difference images An(m) for respective pieces of information are obtained from a learning image, an information map is generated from these difference images and difference weights Wa for the respective difference images. Note that difference weights Wa to be multiplied by the difference images An(m) are hereinafter also referred to as difference weights Wan(m).

For example, the difference images A1(1) through A1(6) are respectively subjected to weighted addition with difference weights Wa1(1) through Wa1(6) for the respective difference images to produce an information map $B1_{in}$. Furthermore, computation using a predefined function f(x) is performed on this information map $B1_{in}$, and consequently an information map $B1_{out}$ is obtained.

For example, the function f(x) is regarded as a hyperbolic cosine function (hyperbolic tangent function) represented by equation (17) as follows.

$$f(x) = a \times \tan h(x \times b) \qquad (17)$$

Note that in equation (17), a and b represent predefined constants, and x represents the pixel value of a pixel on an image. Therefore, in a case where an information map $B1_{out}$ is to be determined, x is regarded as the pixel value of a pixel on the information map $B1_{in}$.

That is to say, the value f(x) obtained by substituting the pixel value x of a pixel on the information map $B1_{in}$ into equation (17) is regarded as the pixel value of a pixel located in the information map $B1_{out}$ at the same position as that of the pixel. The information map $B1_{out}$ obtained in this way corresponds to an information map generated in the image processing apparatus 11, for example, a luminance information map.

Note that the function f(x) is not limited to the hyperbolic cosine function and may be any function. For example, in an ideal model, the function f(x) is regarded as a Sigmoid function in which the value "1" is output in a case where $x \leq 0$ and in which the value "−1" is output in a case where x<0.

When N information maps $B1_{out}$ through $BN_{out}$ are obtained as above, these information maps $Bn_{out}$ (where $1 \leq n \leq N$) are subjected to weighted addition with information weights Wb for the respective information maps to produce a subject map $C_{in}$. Then, computation using a predefined function f(x) is performed on this subject map $C_{in}$, and consequently a subject map $C_{out}$ is obtained. Furthermore, this subject map $C_{out}$ is multiplied by a subject weight Wc, and a result is normalized to produce a final subject map.

Note that, more specifically, at the time of the generation of a subject map $C_{in}$, weighted addition is carried out also using an information map obtained without generating difference images, for example, an information map such as a face information map. In addition, the information weights Wb to be multiplied by the information maps $Bn_{out}$ are hereinafter also referred to as information weights Wbn.

The process for generating a subject map at the time of learning in this way is called Forward Propagation. When a subject map is generated, subsequently, as illustrated in FIG. 19, a process called Back Propagation is performed to update the difference weights Wa, the information weights Wb, and the subject weight Wc. In the process called Back Propagation, a difference between weights, which is a value by which each weight is to be increased or decreased, is determined using the generated subject map and an image label that is prepared in advance for a learning image and that is information indicating the region of the subject on the learning image.

Here, an image label is an image having the same size as a learning image, and is an image in which the pixel value of a pixel located at the same position as that of a pixel in the region of the subject on the learning image is set to 1 while the pixel value of a pixel located at the same position as that of a pixel in the non-subject region on the learning image is set to 0.

In the Back Propagation, first, the difference between a subject map and an image label is determined, and a resulting image is regarded as an evaluation map. Then, a subject weight difference ΔWc, which is an amount by which the subject weight Wc is to be changed, is determined from the evaluation map and the subject map $C_{in}$ using equation (18) as follows.

$$\Delta Wc = \eta \times C_{in} \times \Delta C \quad (18)$$

In equation (18), η represents a learning speed that is a predefined constant, and $C_{in}$ represents the subject map $C_{in}$. Note that, more specifically, $C_{in}$ in equation (18) is regarded as the pixel value of one pixel in the subject map $C_{in}$, and the subject weight difference ΔWc is determined for each pixel. In addition, ΔC is a difference of a subject map, and is determined using equation (19) as follows.

$$\Delta C = EV \times f'(C_{in}) \quad (19)$$

In equation (19), EV represents an evaluation map, and $f'(C_{in})$ is a value obtained by substituting the subject map $C_{in}$ into a function obtained by differentiating the function f(x). The function f'(x) obtained by differentiating the function f(x) is given by, specifically, "a×b×sech(x×b)$^2$".

When subject weight differences ΔWc are obtained in this way, the subject weight differences ΔWc are added to the previous subject weights Wc for update, and new subject weights Wc are obtained.

Subsequently, an information weight difference ΔWbn, which is an amount by which an information weight Wbn is to be changed, is determined using equation (20) below by using the updated subject weight Wc and the information map $Bn_{in}$ generated at the time of the generation of a subject map.

$$\Delta Wbn = \eta \times Bn_{in} \times \Delta Bn \quad (20)$$

In equation (20), η represents a learning speed that is a predefined constant, and $Bn_{in}$ represents the information map $Bn_{in}$. Note that, more specifically, $Bn_{in}$ in equation (20) is regarded as the pixel value of one pixel in the information map $Bn_{in}$, and the information weight difference ΔWbn is determined for each pixel. In addition, ΔBn is a difference of an information map, and is determined using equation (21) as follows.

$$\Delta Bn = \Delta C \times f'(Bn_{in}) \times Wc \quad (21)$$

In equation (21), ΔC represents a value obtained by computing equation (19) described above, and $f'(Bn_{in})$ is a value obtained by substituting the information map $Bn_{in}$ into a function obtained by differentiating the function f(x). In addition, Wc is the updated subject weight Wc.

When information weight differences ΔWbn for information maps $Bn_{in}$ are obtained in this way, the information weight differences ΔWbn are added to information weights Wbn of the information maps $Bn_{in}$ for update, and new information weights Wbn are determined.

Furthermore, difference weight differences ΔWan(m), which are amounts by which the difference weights Wa are to be changed, are determined using equation (22) below by using the updated information weights Wbn and the difference images An(m) generated at the time of the generation of a subject map.

$$\Delta Wan(m) = \eta \times An(m) \times \Delta An(m) \quad (22)$$

In equation (22), η represents a learning speed that is a predefined constant, and An(m) represents a difference image An(m). Note that, more specifically, An(m) in equation (22) is regarded as the pixel value of one pixel in the difference image An(m), and the difference ΔWan(m) is determined for each pixel. In addition, ΔAn(m) is a difference of a difference image, and is determined using equation (23) as follows.

$$\Delta An(m) = \Delta Bn \times f'(An(m)) \times Wbn \quad (23)$$

In equation (23), ΔBn represents a value obtained by computing equation (21) described above, and f'(An(m)) is a value obtained by substituting the difference image An(m) into a function obtained by differentiating the function f(x). In addition, Wbn is the updated information weight Wbn.

When the difference weight differences ΔWan(m) for the difference images An(m) are obtained in this way, the difference weight differences ΔWan(m) are added to the difference weights Wan(m) of the difference images An(m) for update, and new difference weights Wan(m) are determined.

Then, the process described above is repeated using the difference weights Wa, information weights Wb, and subject weights Wc updated as above and the learning image, and final difference weights Wa, information weights Wb, and subject weights Wc are obtained.

In this way, in neural-network-based learning, an evaluation map is generated from a subject map generated with the use of a weight given in advance and an image label, and furthermore, a weight difference that is an amount of change by which each weight is to be changed is determined from the evaluation map using an inverse calculation.

Here, the image label is information indicating the region of the subject on the learning image, and can thus be said to be information indicating the so-called correct answer of the subject map. Therefore, the evaluation map that is the difference between the subject map and the image label represents an error between the ideal subject map and the subject map generated using the given weight, and the inverse calculation using the evaluation map can determine an error between the given weight and the ideal weight.

Then, the determined error is an amount of change by which the given weight is to be changed, and adding this amount of change to the weight can determine a weight that is ideal at the present time. The generation of a subject map using the weight newly determined in this way would allow more reliable detection of the subject from an image using this subject map. In neural-network-based learning, the differences ΔWan(m), the information weight differences ΔWbn, and the subject weight differences ΔWc are determined as amounts of change of weights, and the respective weights are updated.

[Configuration of Learning Apparatus]

Next, a learning apparatus that determines the difference weights Wa, information weights Wb, and subject weights Wc explained as above by using neural-network-based learning will be explained.

Figure 20:
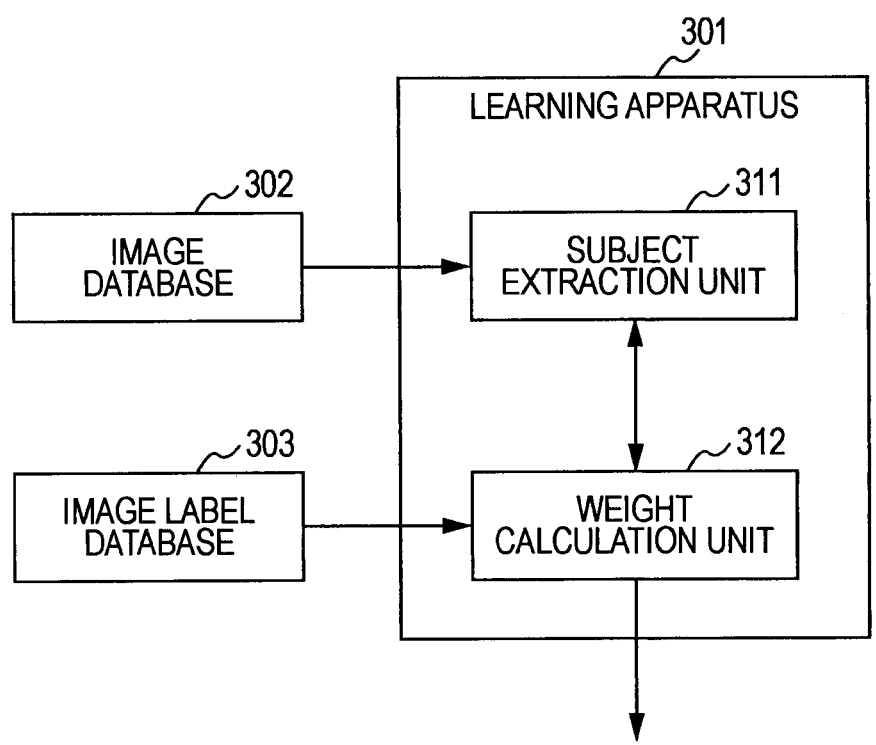
FIG. 20 is a diagram illustrating an example configuration of an embodiment of a learning apparatus to which the present invention is applied.

FIG. 20 is a diagram illustrating an example configuration of an embodiment of a learning apparatus to which the present invention is applied.

An image database 302 and an image label database 303 are connected to a learning apparatus 301. The image database 302 has learning images recorded thereon, and the image label database 303 has recorded thereon image labels regarding the learning images recorded on the image database 302. The learning apparatus 301 performs learning using a learning image and an image label acquired from the image database 302 and the image label database 303.

The learning apparatus 301 is configured using a subject extraction unit 311 and a weight calculation unit 312.

The subject extraction unit 311 uses a learning image acquired from the image database 302, and the difference weights Wa, information weights Wb, and subject weights Wc supplied from the weight calculation unit 312 to generate a subject map from the learning image, and supplies the subject map to the weight calculation unit 312. The weight calculation unit 312 uses an image label acquired from the image label database 303 and the subject map supplied from the subject extraction unit 311 to update the difference weights Wa, the information weights Wb, and the subject weights Wc, and supplies the results to the subject extraction unit 311.

Figure 21:
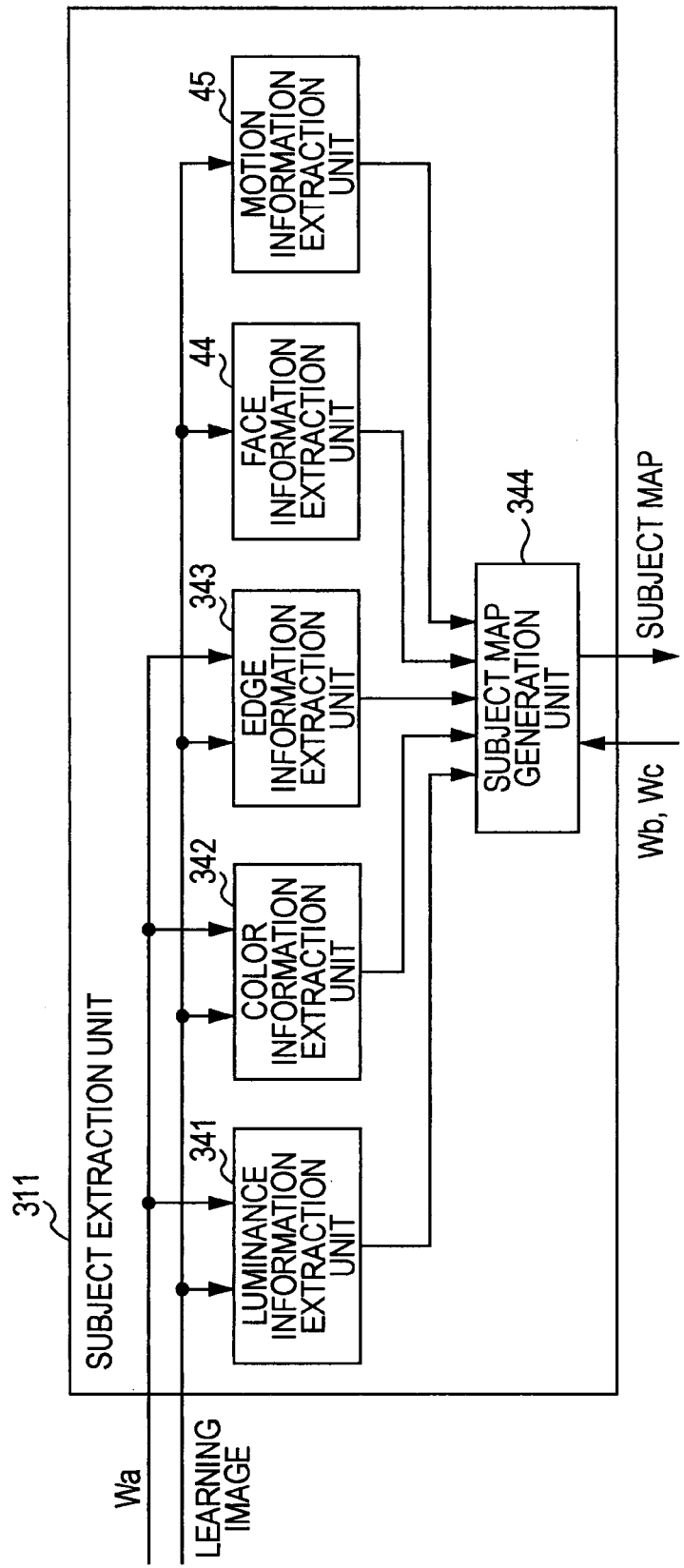
FIG. 21 is a diagram illustrating an example configuration of a subject extraction unit.

For example, the subject extraction unit 311 is configured as illustrated in FIG. 21. That is to say, the subject extraction unit 311 is configured using a luminance information extraction unit 341, a color information extraction unit 342, an edge information extraction unit 343, a face information extraction unit 44, a motion information extraction unit 45, and a subject map generation unit 344. Note that in FIG. 21, portions corresponding to those in the case in FIG. 1 are assigned the same numerals and that explanations thereof are appropriately omitted.

The luminance information extraction unit 341 generates a luminance information map using the learning image from the image database 302 and the difference weights Wa from the weight calculation unit 312, and supplies the luminance information map to the subject map generation unit 344. The color information extraction unit 342 generates a color information map using the learning image from the image database 302 and the difference weights Wa from the weight calculation unit 312, and supplies the color information map to the subject map generation unit 344. In addition, the edge information extraction unit 343 generates an edge information map using the learning image from the image database 302 and the difference weights Wa from the weight calculation unit 312, and supplies the edge information map to the subject map generation unit 344.

The face information extraction unit 44 generates a face information map using the learning image from the image database 302, and supplies the face information map to the subject map generation unit 344. The motion information extraction unit 45 generates a motion information map using the learning image from the image database 302, and supplies the motion information map to the subject map generation unit 344. In addition, the luminance information extraction unit 341 through edge information extraction unit 343 supply difference images to the subject map generation unit 344.

The subject map generation unit 344 generates a subject map using the luminance information map through motion information map from the luminance information extraction unit 341 through motion information extraction unit 45 and the information weights Wb and the subject weights Wc from the weight calculation unit 312. In addition, the subject map generation unit 344 supplies the generated subject map and the respective information maps and difference images from the luminance information extraction unit 341 through motion information extraction unit 45 to the weight calculation unit 312.

Figure 22:
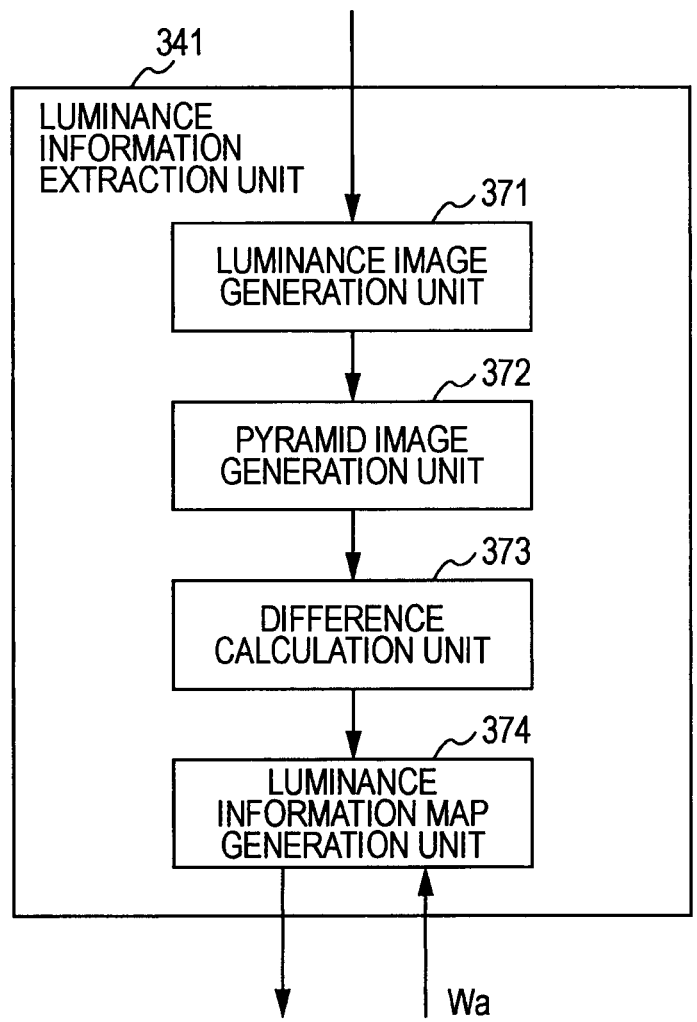
FIG. 22 is a diagram illustrating an example configuration of a luminance information extraction unit.
Figure 23:
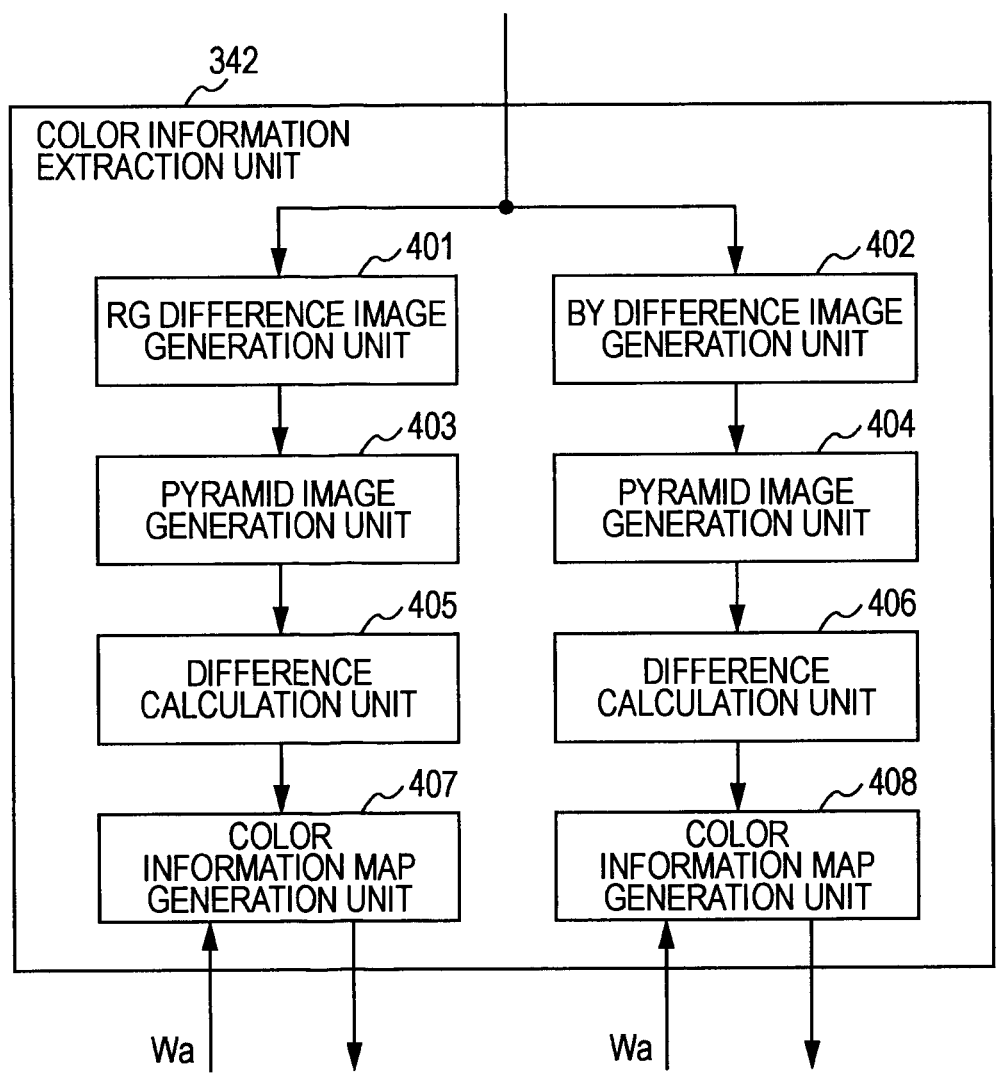
FIG. 23 is a diagram illustrating an example configuration of a color information extraction unit.
Figure 24:
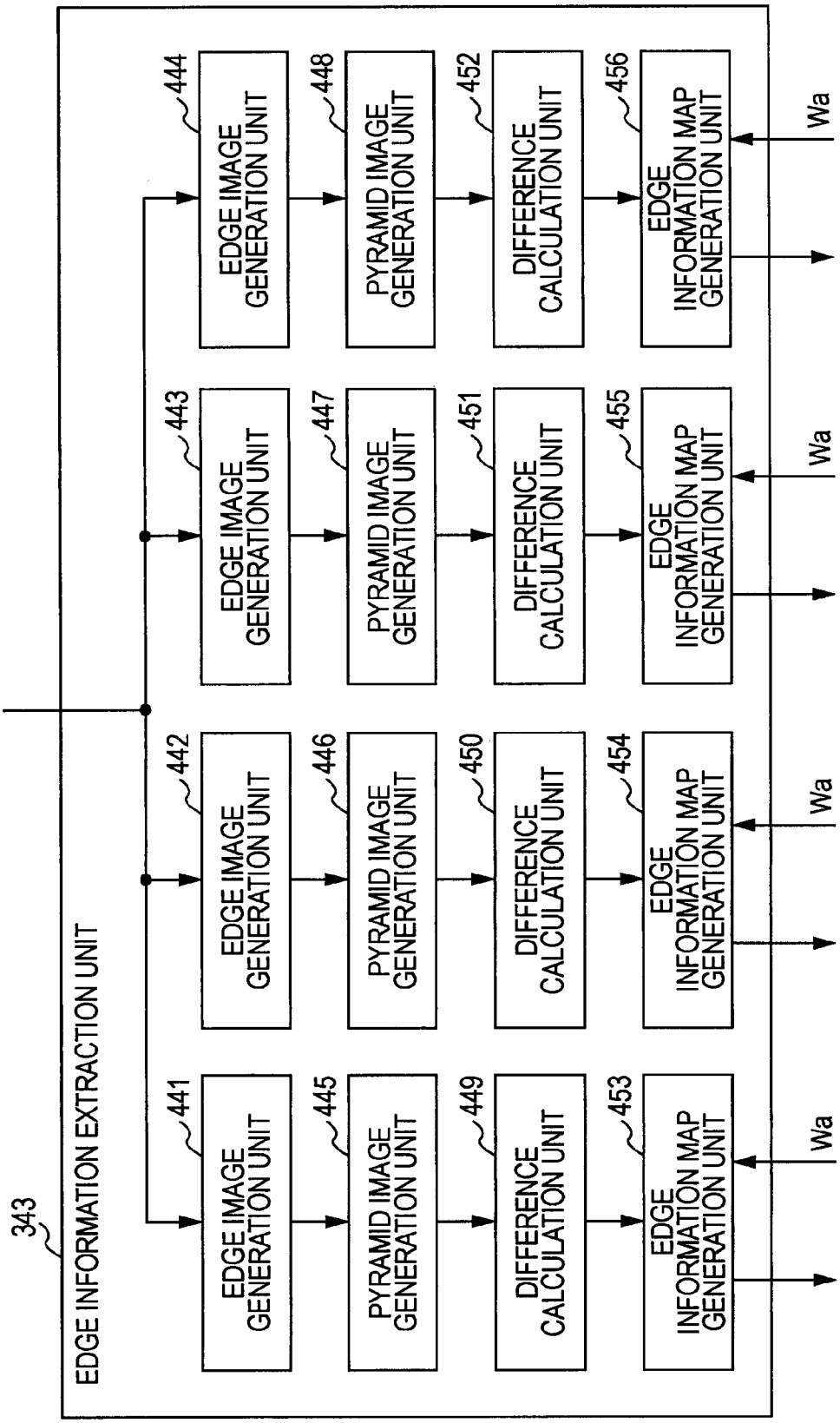
FIG. 24 is a diagram illustrating an example configuration of an edge information extraction unit.

The luminance information extraction unit 341 through edge information extraction unit 343 in FIG. 21 are, more specifically, configured as illustrated in FIGS. 22 through 24.

FIG. 22 is a diagram illustrating an example configuration of the luminance information extraction unit 341.

The luminance information extraction unit 341 is configured using a luminance image generation unit 371, a pyramid image generation unit 372, a difference calculation unit 373, and a luminance information map generation unit 374. Note that the luminance image generation unit 371 through difference calculation unit 373 are similar to the luminance image generation unit 81 through difference calculation unit 83 in FIG. 2, respectively, and explanations thereof are thus omitted.

The luminance information map generation unit 374 performs weighted addition of difference images (corresponding to the difference images An(m)) from the difference calculation unit 373 using the difference weights Wa from the weight calculation unit 312. Then, the luminance information map generation unit 374 substitutes the images (corresponding to the information maps $Bn_{in}$) obtained by weighted addition into the function f(x) to perform computation to thereby generate luminance information maps (corresponding to the information maps $Bn_{out}$), and supplies the luminance information maps to the subject map generation unit 344.

FIG. 23 is a diagram illustrating an example configuration of the color information extraction unit 342 in FIG. 21.

The color information extraction unit 342 is configured using an RG difference image generation unit 401, a BY difference image generation unit 402, a pyramid image generation unit 403, a pyramid image generation unit 404, a difference calculation unit 405, a difference calculation unit 406, a color information map generation unit 407, and a color information map generation unit 408. Note that the RG difference image generation unit 401 through difference calculation unit 406 are similar to the RG difference image generation unit 111 through difference calculation unit 116 in FIG. 3, respectively, and explanations thereof are thus omitted.

The color information map generation unit 407 performs weighted addition of difference images of the RG differences (corresponding to the difference images An(m)) from the difference calculation unit 405 using the difference weights Wa from the weight calculation unit 312. Then, the color information map generation unit 407 substitutes the images (corresponding to the information maps $Bn_{in}$) obtained by weighted addition into the function f(x) to perform computation to thereby generate color information maps of the RG differences (corresponding to the information maps $Bn_{out}$).

Similarly, the color information map generation unit 408 substitutes images, which are obtained by performing weighted addition of difference images of the BY differences from the difference calculation unit 406 using the difference weights Wa from the weight calculation unit 312, into the function f(x) to perform computation, and generates color information maps of the BY differences. The color information map generation units 407 and 408 supply the generated color information maps of the RG differences and color information maps of the BY differences to the subject map generation unit 344.

FIG. 24 is a diagram illustrating an example configuration of the edge information extraction unit 343 in FIG. 21.

The edge information extraction unit 343 is configured using edge image generation units 441 through 444, pyramid image generation units 445 through 448, difference calculation units 449 through 452, and edge information map generation units 453 through 456. Note that the edge image generation unit 441 through difference calculation unit 452 are similar to the edge image generation unit 141 through difference calculation unit 152 in FIG. 4, respectively, and explanations thereof are thus omitted.

The edge information map generation unit 453 performs weighted addition of the difference images in the direction of 0 degrees (corresponding to the difference images An(m)) from the difference calculation unit 449 using the difference weights Wa from the weight calculation unit 312. Then, the edge information map generation unit 453 substitutes the images (corresponding to the information maps $Bn_{in}$) obtained by weighted addition into the function f(x) to perform computation to thereby generate edge information maps in the direction of 0 degrees (corresponding to the information maps $Bn_{out}$).

Similarly, the edge information map generation units 454 through 456 perform weighted addition of the difference images in the respective directions, which are supplied from the difference calculation units 450 through 452, using the difference weights Wa from the weight calculation unit 312 to perform computation of the function f(x), and generate edge information maps in the respective directions. The edge information map generation units 453 through 456 supply the generated edge information maps in the respective directions to the subject map generation unit 344.

Figure 25:
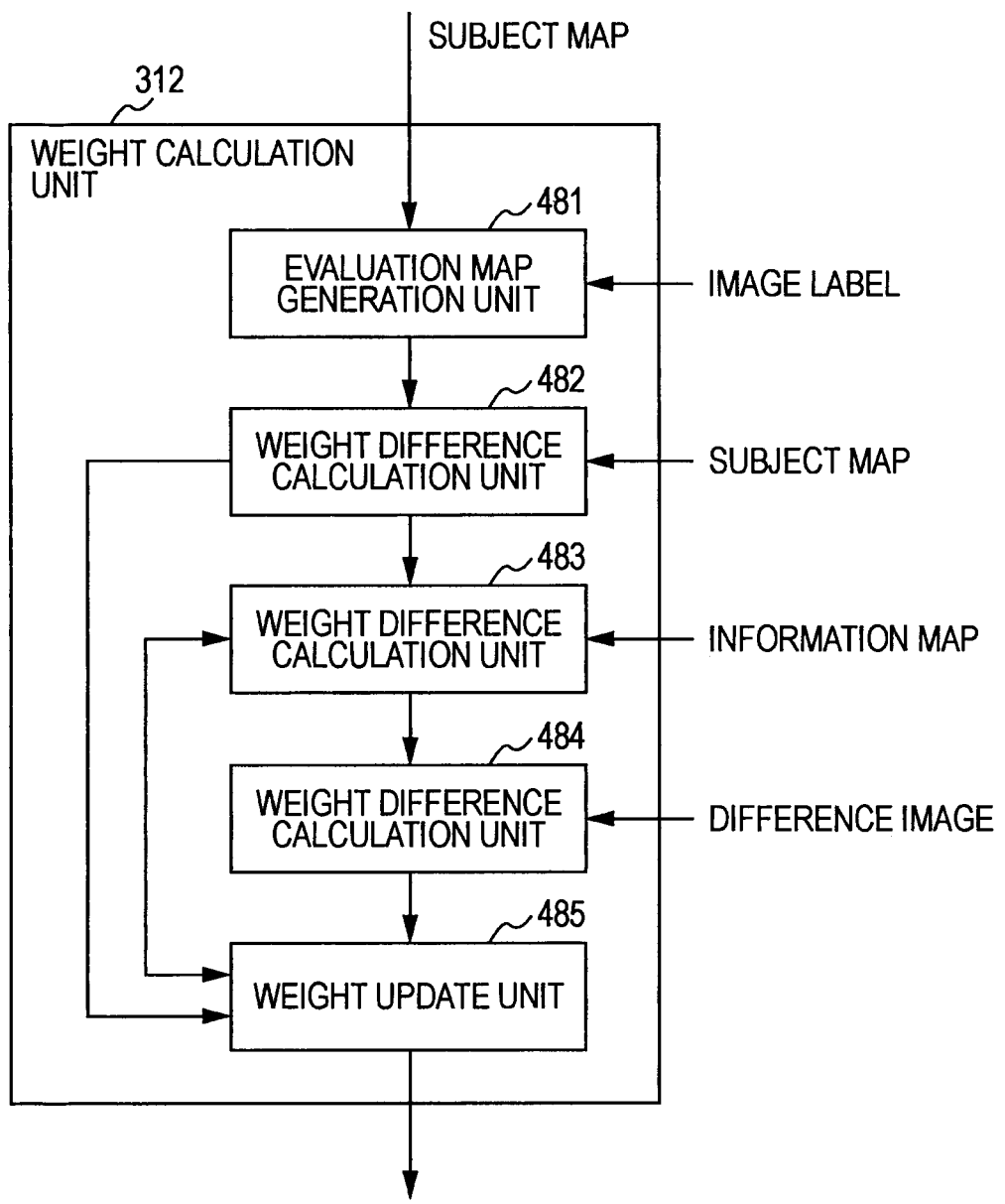
FIG. 25 is a diagram illustrating an example configuration of a weight calculation unit.

In addition, the weight calculation unit 312 in FIG. 20 is, more specifically, configured as illustrated in FIG. 25. That is to say, the weight calculation unit 312 is configured using an evaluation map generation unit 481, weight difference calculation units 482 through 484, and a weight update unit 485.

The evaluation map generation unit 481 generates an evaluation map from the subject map from the subject map generation unit 344 and the image label from the image label database 303, and supplies the evaluation map to the weight difference calculation unit 482.

The weight difference calculation unit 482 generates a subject weight difference ΔWc using the evaluation map from the evaluation map generation unit 481 and the subject map $C_{in}$ from the subject map generation unit 344, and supplies the result to the weight update unit 485. In addition, the weight difference calculation unit 482 supplies the subject map difference ΔC, which has been determined at the time of the calculation of the subject weight difference ΔWc, to the weight difference calculation unit 483.

The weight difference calculation unit 483 generates an information weight difference ΔWbn using the subject map difference ΔC from the weight difference calculation unit 482, the information map $Bn_{in}$ from the subject map generation unit 344, and the subject weight We from the weight update unit 485, and supplies the result to the weight update unit 485. In addition, the weight difference calculation unit 483 supplies the information map difference ΔBn, which has been determined at the time of the calculation of the information weight difference ΔWbn, to the weight difference calculation unit 484.

The weight difference calculation unit 484 generates a difference weight difference ΔWan(m) using the information map difference ΔBn from the weight difference calculation unit 483, the difference image An(m) from the subject map generation unit 344, and the information weight Wbn from the weight update unit 485, and supplies the result to the weight update unit 485.

The weight update unit 485 updates the subject weight Wc, the information weight Wb, and the difference weight Wa using the subject weight difference ΔWc, information weight difference ΔWbn, and difference weight difference ΔWan(m) from the weight difference calculation units 482 through 484. In addition, the weight update unit 485 supplies the updated subject weight and information weight to the subject map generation unit 344, and also supplies the difference weight to the luminance information extraction unit 341 through edge information extraction unit 343 or outputs the subject weight, the information weight, and the difference weight as final weights obtained by learning.

[Operation of Learning Apparatus]

Figure 26:
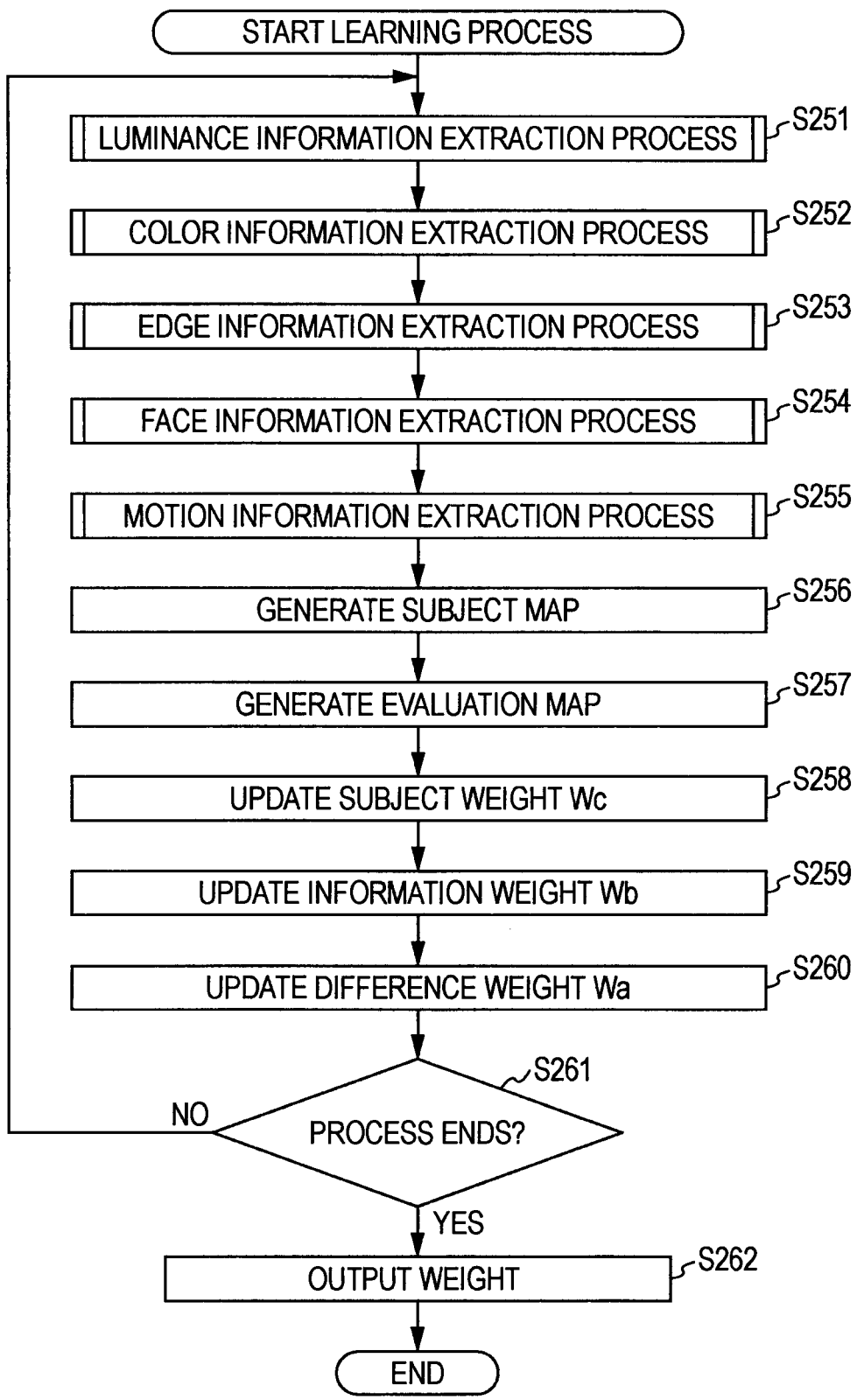
FIG. 26 is a flowchart explaining a learning process.

Next, a learning process that is a process in which the learning apparatus 301 determines a subject weight Wc, an information weight Wb, and a difference weight Wa by learning using a learning image and an image label will be explained with reference to a flowchart of FIG. 26.

In step S251, the luminance information extraction unit 341 performs a luminance information extraction process to generate a luminance information map, and supplies the generated luminance information map and a difference image to the subject map generation unit 344. Note that the luminance information extraction process is similar to the luminance information extraction process explained with reference to FIG. 9 and that an explanation thereof is thus omitted.

In this regard, in step S251, a learning image from the image database 302 is used and a luminance image is generated. In addition, in the process corresponding to step S54 in FIG. 9, the luminance information map generation unit 374 performs weighted addition of the difference images from the difference calculation unit 373 using the difference weights Wa supplied from the weight update unit 485, and generates a luminance information map.

That is to say, luminance difference images serving as the difference images An(m) are subjected to weighted addition with the difference weights Wan(m) to produce an information map $Bn_{in}$, and furthermore, computation is performed on the information map $Bn_{in}$ using equation (17) to generate a luminance information map serving as an information map $Bn_{out}$.

At the time of the generation of the information map $Bn_{in}$, the pixel value of a pixel in each of the luminance difference images An(m) is multiplied by a difference weight Wan(m) for each difference image, and the sum total of the pixel values of pixels located at the same position in the respective difference images, which have been multiplied by the difference weights, is regarded as the pixel value of a pixel in the information map $Bn_{in}$. In addition, in the computation of equation (17), a value obtained by substituting the pixel value x of each pixel in the information map $Bn_{in}$ into equation (17) is regarded as the pixel value of a pixel in a luminance information map serving as an information map $Bn_{out}$.

The luminance information map generation unit 374 supplies the difference images from the difference calculation unit 373, the generated luminance information map, and the luminance information maps serving as the information maps $Bn_{in}$ to the subject map generation unit 344.

In step S252, the color information extraction unit 342 performs a color information extraction process to generate a color information map, and supplies the generated color information map and a difference image to the subject map generation unit 344. Note that the color information extraction process is similar to the color information extraction process explained with reference to FIG. 10 and that an explanation thereof is thus omitted.

In this regard, in step S252, a learning image from the image database 302 is used and an RG difference image and a BY difference image are generated. In addition, in the process corresponding to step S85 in FIG. 10, the color information map generation units 407 and 408 perform weighted addition of the difference images from the difference calculation units 405 and 406 using the difference weights Wa from the weight update unit 485 to generate color information maps.

That is to say, difference images of RG differences or difference images of BY differences, which serve as the difference images An(m), are subjected to weighted addition with the difference weights Wan(m) to produce an information map $Bn_{in}$. Furthermore, the computation of equation (17) is performed on the information map $Bn_{in}$, and a color information map of the RG differences or a color information map of the BY differences, which serves as an information map $Bn_{out}$, is generated.

The color information map generation units 407 and 408 supply the difference images from the difference calculation units 405 and 406, the generated color information map, and the color information maps serving as the information maps $Bn_{in}$ to the subject map generation unit 344.

In step S253, the edge information extraction unit 343 performs an edge information extraction process to generate an edge information map, and supplies the generated edge information map and difference images to the subject map generation unit 344. Note that the edge information extraction process is similar to the edge information extraction process explained with reference to FIG. 11 and that an explanation thereof is thus omitted.

In this regard, in step S253, a learning image from the image database 302 is used and edge images in the respective directions are generated. In addition, in the process corresponding to step S114 in FIG. 11, the edge information map generation units 453 through 456 perform weighted addition of the difference images from the difference calculation units 449 through 452 using the difference weights Wa from the weight update unit 485, and generate edge information maps.

That is to say, difference images in respective directions serving as the difference images An(m) are subjected to weighted addition with the difference weights Wan(m) for these respective directions to produce information maps $Bn_{in}$. Furthermore, the computation of equation (17) is performed on the information maps $Bn_{in}$, and edge information maps in the respective directions of 0 degrees, 45 degrees, 90 degrees, and 135 degrees are generated as information maps $Bn_{out}$.

The edge information map generation units 453 through 456 supply the difference images from the difference calculation units 449 through 452, the generated edge information maps in the respective directions, and the edge information maps in the respective directions serving as the information maps $Bn_{in}$ to the subject map generation unit 344.

In step S254, the face information extraction unit 44 performs a face information extraction process using the learning image from the image database 302 to generate a face information map serving as an information map $Bn_{out}$, and supplies the face information map to the subject map generation unit 344. Note that this face information extraction process is similar to the face information extraction process explained with reference to FIG. 12 and that an explanation thereof is thus omitted.

In step S255, the motion information extraction unit 45 performs a motion information extraction process using the learning image from the image database 302 to generate a motion information map serving as an information map $Bn_{out}$, and supplies the motion information map to the subject map generation unit 344. Note that this motion information extraction process is similar to the motion information extraction process explained with reference to FIG. 13 and that an explanation thereof is thus omitted.

In step S256, the subject map generation unit 344 generates a subject map using the luminance information map through motion information map from the luminance information extraction unit 341 through motion information extraction unit 45 and the information weights Wb and the subject weights Wc from the weight update unit 485.

That is to say, the subject map generation unit 344 multiplies the luminance information map through motion information map, which serve as the information maps $Bn_{out}$, by the information weights Wbn for the respective information maps to perform weighted addition to generate a subject map $C_{in}$. Here, the sum total of pixel values of pixels at the same position in the respective information maps, which have been multiplied by the information weights Wbn, is regarded as the pixel value of a corresponding pixel in the subject map $C_{in}$.

In addition, the subject map generation unit 344 regards a value obtained by substituting the pixel value x of each pixel in the subject map $C_{in}$ into equation (17) as the pixel value of a corresponding pixel in the subject map $C_{out}$, and furthermore, multiplies the pixel value of each pixel in the subject map $C_{out}$ by the subject weight Wc. The results are normalized to produce a final subject map.

The subject map generation unit 344 supplies the generated final subject map to the evaluation map generation unit 481, and also supplies the subject map $C_{in}$ to the weight difference calculation unit 482. In addition, the subject map generation unit 344 supplies the respective information maps $Bn_{in}$ from the luminance information extraction unit 341 through motion information extraction unit 45 to the weight difference calculation unit 483, and supplies the respective difference images from the luminance information extraction unit 341 through edge information extraction unit 343 to the weight difference calculation unit 484. Note that in this case, the face information map and the motion information map, which have been generated as information maps $Bn_{out}$, are handled as information maps $Bn_{in}$, and are supplied to the weight difference calculation unit 483.

In step S257, the evaluation map generation unit 481 determines the difference between the subject map from the subject map generation unit 344 and the image label from the image label database 303 to thereby generate an evaluation map. That is to say, when a designated pixel in a subject map is regarded as a pixel of interest, the difference between the pixel value of the pixel of interest and the pixel value of a pixel located in the image label at the same position as that of the pixel of interest is determined, and this difference is regarded as the pixel value of a pixel located in the evaluation map at the same position as that of the pixel of interest. The evaluation map generation unit 481 supplies the generated evaluation map to the weight difference calculation unit 482.

In step S258, the weight update unit 485 updates the subject weight Wc. That is to say, the weight difference calculation unit 482 computes equations (18) and (19) described above using the evaluation map EV supplied from the evaluation map generation unit 481 and the subject map $C_{in}$ from the subject map generation unit 344, and determines a subject weight difference ΔWc.

The weight difference calculation unit 482 supplies the determined subject weight difference ΔWc to the weight update unit 485, and also supplies the subject map difference ΔC determined by the computation of equation (19) to the weight difference calculation unit 483. Then, the weight update unit 485 adds the subject weight difference ΔWc from the weight difference calculation unit 482 to the held subject weight Wc to update the subject weight Wc.

In step S259, the weight update unit 485 updates the information weight Wbn. That is to say, the weight difference calculation unit 483 computes equations (20) and (21) described above using the subject map difference ΔC supplied from the weight difference calculation unit 482, the information map $Bn_{in}$ from the subject map generation unit 344, and the updated subject weight We from the weight update unit 485, and determines an information weight difference ΔWbn. This information weight difference ΔWbn is determined for each information map, that is, each of the luminance information map, the color information map of the RG difference, the color information map of the BY difference, the edge information maps in the respective directions of 0 degrees through 135 degrees, the face information map, and the motion information map.

The weight difference calculation unit 483 supplies the determined information weight difference ΔWbn to the weight update unit 485, and also supplies the information map difference ΔBn determined by the computation of equation (21) to the weight difference calculation unit 484. Then, the weight update unit 485 adds the information weight difference ΔWbn from the weight difference calculation unit 483 to the held information weight Wbn to update the information weight Wbn.

Accordingly, the respective information weights Wb of the luminance information map, the color information map of the RG difference, the color information map of the BY difference, the edge information maps in the respective directions of 0 degrees through 135 degrees, the face information map, and the motion information map are updated.

In step S260, the weight update unit 485 updates the difference weight Wa. That is to say, the weight difference calculation unit 484 computes equations (22) and (23) described above using the information map difference ΔBn supplied from the weight difference calculation unit 483, the difference image An(m) from the subject map generation unit 344, and the updated information weight Wbn from the weight update unit 485, and determines a difference weight difference ΔWan(m). This difference weight difference ΔWan(m) is determined for each difference image with respect to the respective information maps. For example, as described above, since a luminance information map is determined from five luminance difference images, a difference weight difference ΔWan(m) is determined for each of these five difference images with regard to the luminance information map.

The weight difference calculation unit 484 supplies the determined difference ΔWan(m) to the weight update unit 485, and the weight update unit 485 adds the difference ΔWan(m) from the weight difference calculation unit 484 to the held difference weight Wan(m) to update the difference weight Wan(m).

With the above process, the updated difference weight Wan(m), information weight Wbn, and subject weight Wc are obtained.

In step S261, the weight calculation unit 312 determines whether or not a process of repeatedly updating the difference weight Wan(m), the information weight Wbn, and the subject weight Wc ends. For example, in a case where the absolute value of the maximum value of pixel values of pixels in the evaluation map, which is last determined in step S257, is less than or equal to a predefined threshold value and where the update of the difference weight, the information weight, and the subject weight has been performed a predefined number of times or more, it is determined that the process ends.

That is to say, in a case where a subject map for which the subject is extracted with sufficient accuracy from an image using an information map generated from the image, a determined difference weight Wan(m), an information weight Wbn, and a subject weight Wc is obtained, it is determined that the process ends.

In a case where it is determined in step S261 that the process does not end, the weight update unit 485 supplies the updated difference weight Wan(m) to the luminance information extraction unit 341 through edge information extraction unit 343, and supplies the information weight Wbn and the subject weight We to the subject map generation unit 344. Then, thereafter, the process returns to step S251, and the process described above is repeated.

Note that in the processing of steps S251 through S255 which is repeatedly performed, the same image as the previously used learning image is used, and individual information maps are generated. Therefore, in the processing of steps S251 through S253, the previously used difference image may be used as it is and an information map may be generated. In addition, also in the processing of steps S254 and S255, the previously used information map may be regarded as it is as a generated information map.

On the other hand, in a case where it is determined in step S261 that the process ends, a weight for obtaining a subject map for which the subject is extracted with sufficient accuracy from an image has been determined and therefore, the process proceeds to step S262.

In step S262, the weight update unit 485 outputs the updated difference weight Wan(m), information weight Wbn, and subject weight We as final weights determined by learning, and the learning process ends.

In this way, the learning apparatus 301 performs a learning process using a learning image including a general subject, and generates a weight that is used to generate a subject map. Therefore, the generation of a subject map using a weight obtained by learning would allow more reliable detection of a general subject from an image using this subject map.

In addition, in a case where an information map obtained by extracting information about a region estimated to have a larger number of subjects than other regions, and a weight are used to generate a subject map from an image, a weight is generated by neutral-network-based learning. Thereby, a weight can easily be obtained.

That is to say, a structure in which an information map is generated from a difference image and in which a subject map is generated from the information map is very similar to a neutral network model, and the application of a learning method called a neutral network to the learning of weights allows the determination of weights with an easy process. In addition, neutral-network-based learning allows weights of individual information maps and weights of individual difference images to be determined using parallel processes, and thus allows more quick generation of weights.

Note that while an explanation has been given in which in the learning apparatus 301, the last updated difference weight Wan(m), information weight Wbn, and subject weight We are output as final weights, a weight with the highest evaluation among weights determined by updating may be output as a final weight. In such a case, each time a weight is updated, this weight and an evaluation map obtained using this weight are recorded, and, after the weight is updated a designated number of times, a weight with the highest evaluation value, which is determined from the absolute values of the pixel values of pixels in the evaluation maps, among the recorded weights is output.

The learning apparatus 301 explained as above may be incorporated in, for example, an image capture apparatus or the like serving as an apparatus which forms an image evaluation system together with the image processing apparatus 11 described above.

Figure 27:
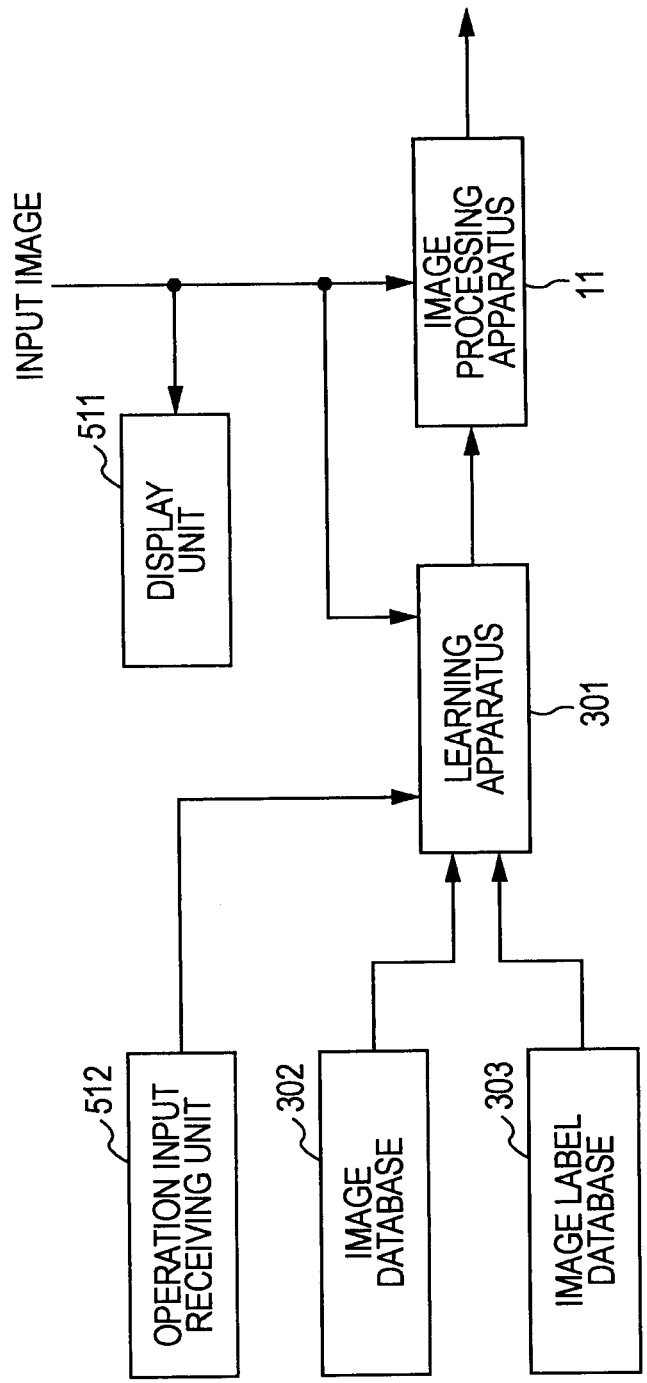
FIG. 27 is a diagram illustrating an example configuration of an image evaluation system.

In such a case, the image evaluation system is configured as illustrated in, for example, FIG. 27. That is to say, the image evaluation system is configured using the image processing apparatus 11, the learning apparatus 301, the image database 302, the image label database 303, a display unit 511, and an operation input receiving unit 512. Note that in FIG. 27, portions corresponding to those in the case in FIGS. 1 and 20 are assigned the same numerals and that explanations thereof are appropriately omitted.

In this image evaluation system, an input image obtained by image capture or an image recorded in advance on the image database 302 is regarded as a learning image.

For example, in a case where an image recorded on the image database 302 is used as a learning image, the learning apparatus 301 performs a learning process using a learning image acquired from the image database 302 and an image label acquired from the image label database 303. Then, a difference weight Wan(m), an information weight Wbn, and a subject weight Wc, which have been obtained in the learning process, are supplied from the learning apparatus 301 to the image processing apparatus 11. The image processing apparatus 11 performs the image evaluation process explained with reference to FIG. 8 using the weight supplied from the learning apparatus 301 and the input image input thereto, and determines and outputs the score for the input image.

In contrast, in a case where an input image is used to perform learning, the input image is supplied to the display unit 511, the image processing apparatus 11, and the learning apparatus 301. The display unit 511 is formed of, for example, a liquid crystal display or the like, and displays the input image input thereto.

In addition, the operation input receiving unit 512 formed of, for example, a touch panel or the like is superposed on the display unit 511, and a user performs an operation on the operation input receiving unit 512 to specify a region to be regarded as the subject in the input image displayed on the display unit 511. And the operation input receiving unit 512 generates an image label in accordance with the user's operation, and supplies the image label to the learning apparatus 301.

For example, the operation input receiving unit 512 sets the pixel value of a pixel in a region in a label image to be generated from now, which is the same as the region specified by the user on the input image, to 1, and sets the pixel value of a pixel in the remaining region to 0. That is to say, the pixel value of a pixel in the same region in the label image as a region that is not specified by the user on the input image is set to 0.

The learning apparatus 301 regards the input image input thereto as a learning image, and performs a learning process using the learning image and the image label supplied from the operation input receiving unit 512 to generate a difference weight Wan(m), an information weight Wbn, and a subject weight Wc. Then, the learning apparatus 301 supplies the generated weight to the image processing apparatus 11, and the image processing apparatus 11 performs an image evaluation process using the weight from the learning apparatus 301, and determines and outputs the score for the input image.

Therefore, if such an image evaluation system is built in an image capture apparatus, the image capture apparatus can display a score or the like for an input image as to whether or not a captured input image is the best shot on the basis of the score output from the image processing apparatus 11.

Note that the operation input receiving unit 512 is not limited to a touch panel and may be configured using a sensor or the like that utilizes infrared radiation to detect the direction of the line of sight of a user who looks through the viewfinder. In such a case, an input image is supplied to the operation input receiving unit 512, an object included in a region specified on the input image using the line-of-sight direction detected by the sensor is regarded as the subject, and an image label is generated.

In addition, the series of processes described above can be executed by hardware or can also be executed by software. In a case where the series of processes is executed by software, a program constituting the software is installed from a program recording medium into a computer incorporated in dedicated hardware or, for example, a general-purpose personal computer or the like capable of executing various functions by being installed with various programs.

Figure 28:
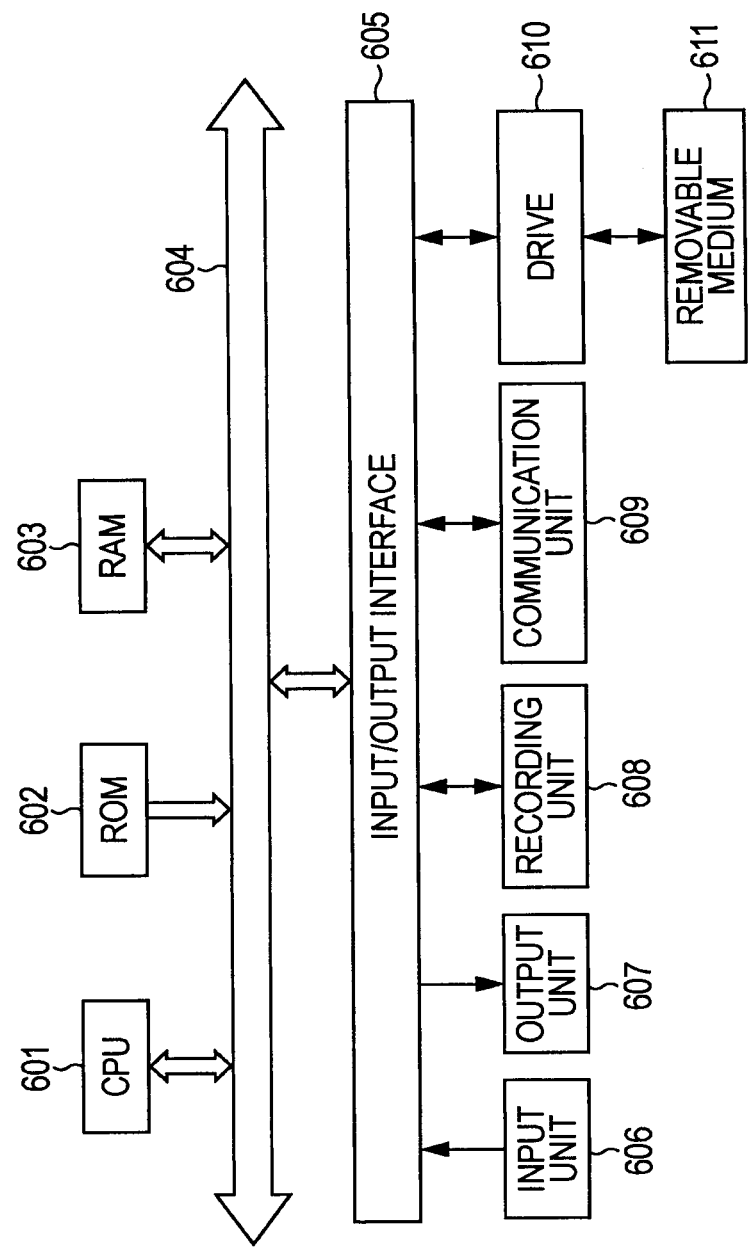
FIG. 28 is a diagram illustrating an example configuration of a computer.

FIG. 28 is a block diagram illustrating an example hardware configuration of a computer that executes the series of processes described above using a program.

In the computer, a CPU (Central Processing Unit) 601, a ROM (Read Only Memory) 602, and a RAM (Random Access Memory) 603 are connected to one another via a bus 604.

An input/output interface 605 is furthermore connected to the bus 604. An input unit 606 formed of a keyboard, a mouse, a microphone, and the like, an output unit 607 formed of a display, a speaker, and the like, a recording unit 608 formed of a hard disk, a non-volatile memory, and the like, a communication unit 609 formed of a network interface and the like, and a drive 610 that drives a removable medium 611 such as a magnetic disk, an optical disk, a magneto-optical disk, or a semiconductor memory are connected to the input/output interface 605.

In the computer configured as above, the CPU 601 loads a program recorded on, for example, the recording unit 608 onto the RAM 603 via the input/output interface 605 and the bus 604, and executes the program, thereby performing the series of processes described above.

The program executed by the computer (the CPU 601) is recorded on, for example, the removable medium 611 that is a package medium formed of a magnetic disk (including a flexible disk), an optical disk (such as a CD-ROM (Compact Disc-Read Only Memory) or a DVD (Digital Versatile Disc)), a magneto-optical disk, a semiconductor memory, or the like, or is provided via a wired or wireless transmission medium such as a local area network, the Internet, or digital satellite broadcasting.

Then, the removable medium 611 is placed in the drive 610, thereby allowing the program to be installed into the recording unit 608 via the input/output interface 605. In addition, the program can be received by the communication unit 609 via a wired or wireless transmission medium, and can be installed into the recording unit 608. Alternatively, the program can be installed in advance into the ROM 602 or the recording unit 608.

Note that the program executed by the computer may be a program in which the processes are performed time-sequentially in the order explained in this specification, or may be a program in which the processes are performed in parallel or at a required timing such as when they are called.

Note that the embodiments of the present invention are not to be limited to the embodiments described above and that a variety of modifications can be made without departing from the scope of the present invention.

REFERENCE SIGNS LIST

11 image processing apparatus, 41 luminance information extraction unit, 42 color information extraction unit, 43 edge information extraction unit, 44 face information extraction unit, 45 motion information extraction unit, 46 subject map generation unit, 51 blur determination unit, 54 score calculation unit, 84 luminance information map generation unit, 117 color information map generation unit, 118 color information map generation unit, 153 through 156 edge information map generation units, 182 face information map generation unit, 214 motion information map generation unit, 241 edge map generation unit, 245 edge point extraction unit, 246 extraction amount determination unit, 247 edge analysis unit, 248 blur degree detection unit, 301 learning apparatus, 311 subject extraction unit, 312 weight calculation unit

The invention claimed is:

1. A learning apparatus that determines a weight using neural-network-based learning, the weight being used to generate a subject map for specifying a region of a subject on an image, comprising:
information map generating means for extracting a feature value of a feature of the region of the subject from a learning image that includes the subject and that is used for the learning, and generating an information map representing the feature value in each region of the learning image;
subject map generating means for generating the subject map by performing weighted addition of, using the weight, the plurality of information maps representing the feature value of the feature, which are different from each other;
weight change amount calculating means for calculating an amount of change by which the weight is to be changed using the subject map and an image label that is determined in advance and that represents the region of the subject in the learning image; and
updating means for adding the amount of change to the weight and updating the weight.

2. The learning apparatus according to claim 1, wherein a process in which the amount of change is newly determined using the weight updated by the updating means and the learning image and in which the weight is updated is repeatedly performed.

3. A learning method for a learning apparatus that determines a weight using neural-network-based learning, the weight being used to generate a subject map for specifying a region of a subject on an image, the learning apparatus including
information map generating means for extracting a feature value of a feature of the region of the subject from a learning image that includes the subject and that is used for the learning, and generating an information map representing the feature value in each region of the learning image;
subject map generating means for generating the subject map by performing weighted addition of, using the weight, the plurality of information maps representing the feature value of the feature, which are different from each other;
weight change amount calculating means for calculating an amount of change by which the weight is to be changed using the subject map and an image label that is determined in advance and that represents the region of the subject in the learning image; and
updating means for adding the amount of change to the weight and updating the weight, the learning method comprising the steps of:
generating, by the information map generating means, the information map from the learning image;
performing, by the subject map generating means, weighted addition of the information map and generating the subject map;
calculating, by the weight change amount calculating means, the amount of change using the subject map and the image label; and
adding, by the updating means, the amount of change to the weight and updating the weight.

4. A program stored on a non-transitory computer-readable medium for causing a computer to execute a process that is a learning method for determining a weight using neural-network-based learning, the weight being used to generate a subject map for specifying a region of a subject on an image, the process comprising the steps of:
extracting a feature value of a feature of the region of the subject from a learning image that includes the subject and that is used for the learning, and generating an information map representing the feature value in each region of the learning image;
generating the subject map by performing weighted addition of, using the weight, the plurality of information maps representing the feature value of the feature, which are different from each other;
calculating an amount of change by which the weight is to be changed using the subject map and an image label that is determined in advance and that represents the region of the subject in the learning image; and
adding the amount of change to the weight and updating the weight.

* * * * *